US008775957B2

(12) United States Patent
Kim

(10) Patent No.: US 8,775,957 B2
(45) Date of Patent: Jul. 8, 2014

(54) METHOD FOR OPERATING EXECUTION ICON OF MOBILE TERMINAL

(75) Inventor: Sang-Won Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 606 days.

(21) Appl. No.: 12/624,196

(22) Filed: Nov. 23, 2009

(65) Prior Publication Data

US 2010/0138763 A1 Jun. 3, 2010

(30) Foreign Application Priority Data

Dec. 1, 2008 (KR) .................. 10-2008-0120751
Jul. 10, 2009 (KR) .................. 10-2009-0063177

(51) Int. Cl.
*G06F 3/048* (2013.01)

(52) U.S. Cl.
CPC .................................... *G06F 3/048* (2013.01)
USPC ........................................ 715/765; 345/619

(58) Field of Classification Search
USPC ............. 715/764, 765, 846; 705/59; 717/107; 455/405
See application file for complete search history.

(56) References Cited

U.S. PATENT DOCUMENTS

| 6,526,409 B1 * | 2/2003 | Olsen et al. ..................... 705/40 |
| 7,363,591 B2 * | 4/2008 | Goldthwaite et al. ........ 715/763 |
| 2005/0270307 A1 * | 12/2005 | Jacques Brouaux .......... 345/619 |
| 2007/0239618 A1 * | 10/2007 | Sakagawa et al. .............. 705/59 |
| 2008/0141153 A1 | 6/2008 | Samson et al. |
| 2008/0168368 A1 * | 7/2008 | Louch et al. ................... 715/764 |
| 2008/0229280 A1 * | 9/2008 | Stienhans ...................... 717/107 |
| 2008/0319782 A1 * | 12/2008 | Good ............................... 705/1 |
| 2009/0019385 A1 * | 1/2009 | Khatib et al. ................. 715/765 |
| 2010/0022216 A1 * | 1/2010 | Bandera et al. ............... 455/405 |
| 2010/0095248 A1 * | 4/2010 | Karstens ....................... 715/846 |

* cited by examiner

*Primary Examiner* — Matt Kim
*Assistant Examiner* — Tuan S Nguyen
(74) *Attorney, Agent, or Firm* — Lee, Hong, Degerman, Kang & Waimey

(57) ABSTRACT

Functional applications (e.g., widgets) in the form of an icon are implemented to be merged or demerged, and a method for displaying, operating, and managing the widgets in a mobile terminal is provided. The concept of UI-wise merging and demerging is applied to simple widget functions to update the widget functions. Also, widgets can be effectively managed through various widget operations. The mobile terminal includes an input unit configured to detect a received input, a display unit configured to display a plurality of widgets and a controller configured to merge a plurality of widgets into an integrated widget based on the received input and to execute an integrated function related to a selected widget of the plurality of widgets merged into the integrated widget.

29 Claims, 30 Drawing Sheets

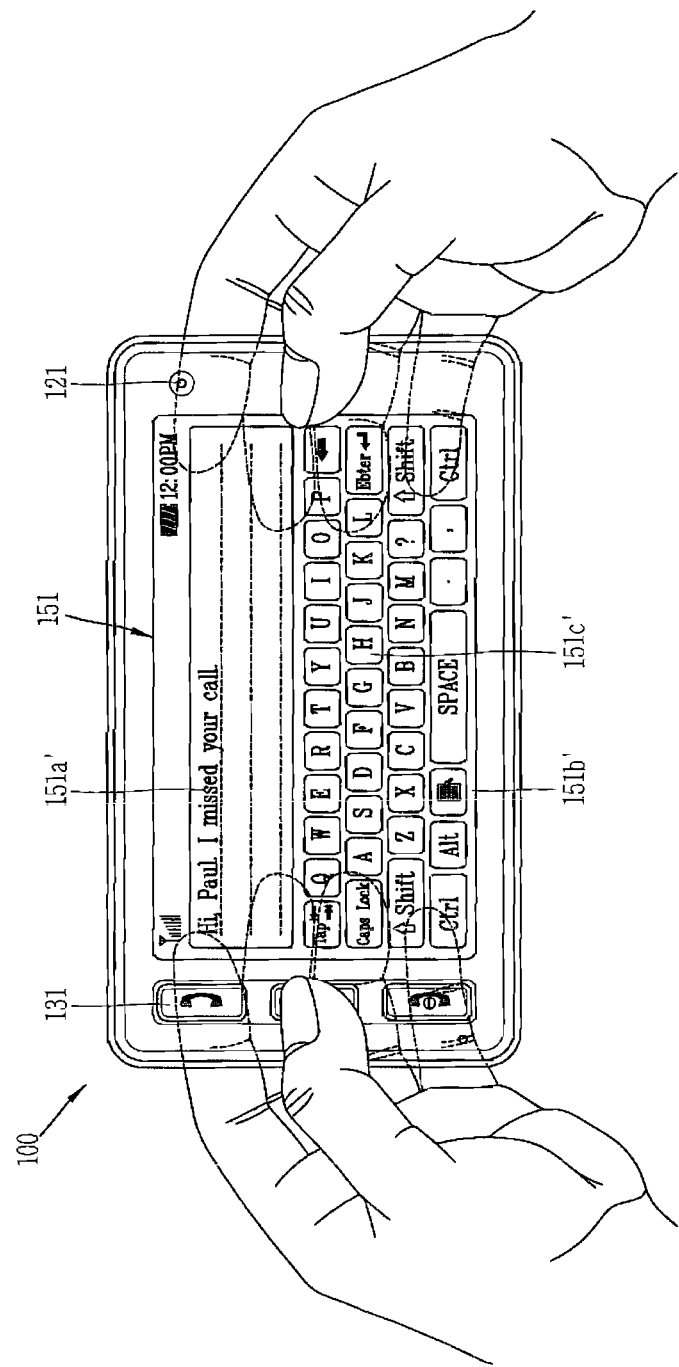

WIDGET MOVED AND MERGED (A)

(B)

< TILTING >

METHOD FOR OPERATING EXECUTION ICON OF MOBILE TERMINAL

CROSS-REFERENCE TO RELATED APPLICATIONS

Pursuant to 35 U.S.C. §119, this application claims the benefit of earlier filing date and right of priority to Korean Application No. 10-2008-0120751, filed on Dec. 1, 2008, and Korean Application No. 10-2009-0063177, filed on Jul. 10, 2009, the contents of which are all incorporated by reference herein in their entirety.

BACKGROUND OF THE INVENTION

1. Field of the Invention

The present invention relates to a mobile terminal and, more particularly, to a user interface (UI) of a mobile terminal.

2. Description of the Related Art

A mobile terminal is a portable device having one or more functions of voice and video communications, inputting/outputting information, or storing data.

As mobile terminals have various functions in addition to communication, such as capturing images and video via a camera, playing music files or video, playing games, or receiving broadcasts, mobile terminals are implemented in the form of comprehensive multimedia players.

Efforts are ongoing to support and increase the complicated functions of the multimedia players. Such efforts include a touch screen and a user interface (UI) allowing a user to easily and conveniently manipulate and select menus.

SUMMARY OF THE INVENTION

Accordingly, one object of the present invention is to address the above-noted and other problems.

Another object of the present invention is to provide a mobile terminal capable of merging and demerging functional applications in the form of icons.

Still another object of the present invention is to provide a mobile terminal for managing execution and display of functional applications in the form of icons.

To achieve these and other advantages and in accordance with the purpose of the present invention, as embodied and broadly described herein, the present invention provides in one aspect a mobile terminal including: an input unit configured to detect an external input; a display unit configured to display a plurality of widgets; and a controller configured to merge or demerge widgets or execute an integrated function based on merged widgets according to an external input.

To achieve these and other advantages and in accordance with the purpose of the present invention, as embodied and broadly described herein, the present invention provides, in another aspect, a method for operating a widget of a mobile terminal, including: coupling two or more widgets according to a user selection; displaying an integrated widget according to the merged widgets; and selectively executing a function of the integrated widget according to a user input.

Further scope of the applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 3A and 3B are front views for explaining an operational state of the mobile terminal according to an exemplary embodiment of the present invention;

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

Figure 1:
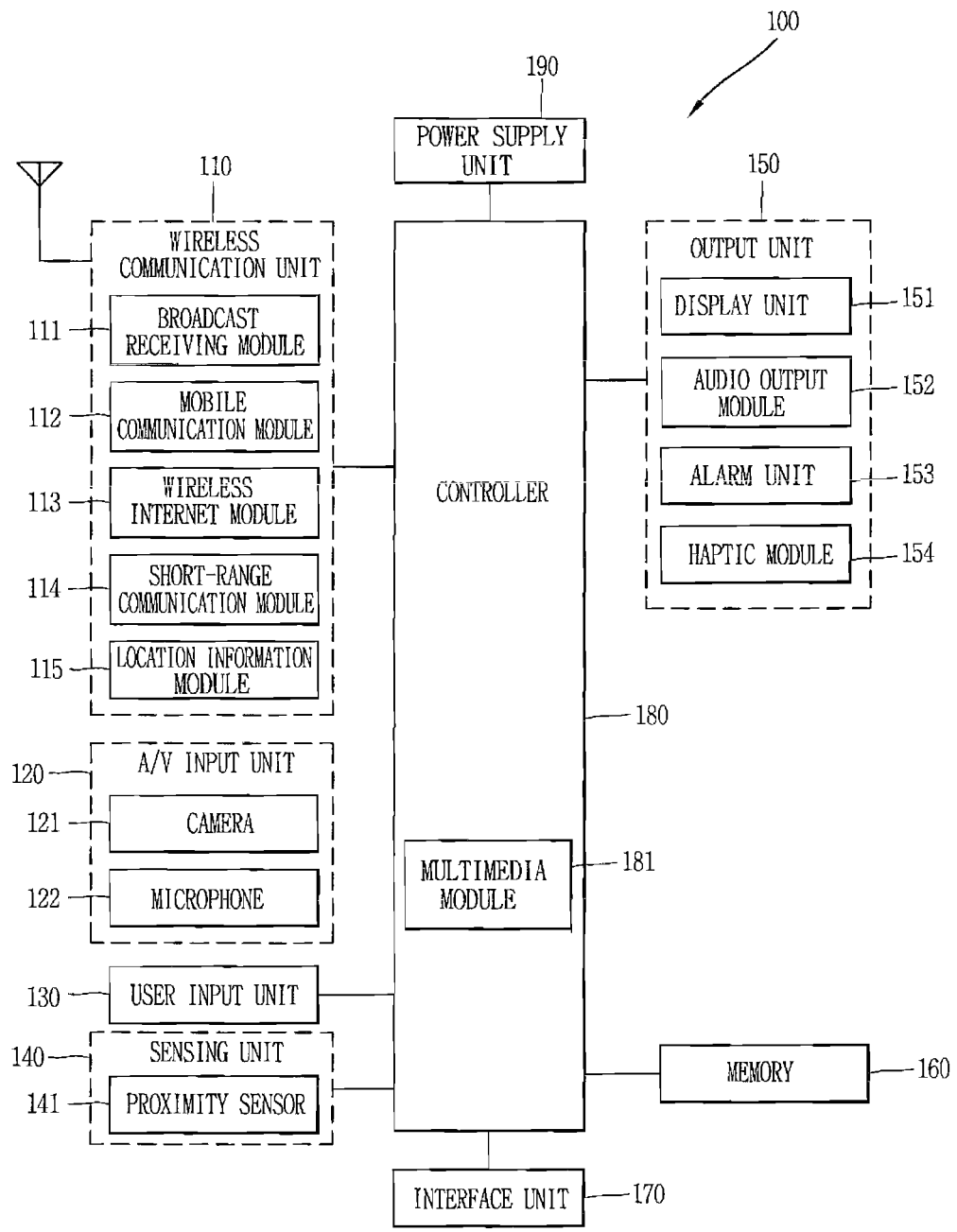
FIG. 1 is a schematic block diagram of a mobile terminal implementing an embodiment of the present invention.

FIG. 1 is a schematic block diagram of a mobile terminal implementing an embodiment of the present invention.

The mobile terminal described in the present invention may include mobile phones, smart phones, notebook computers, digital broadcast receivers, PDAs (Personal Digital Assistants), PMPs (Portable Multimedia Player), and navigation devices. It would be understood by a person of ordinary skill in the art that the configuration according to the embodiments of the present invention can be also applicable to the fixed types of terminals such as digital TVs, or desk top computers, except for any elements specifically configured for a mobile terminal purpose.

The mobile terminal according to an embodiment of the present invention will now be described with reference to FIG. 1.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190.

FIG. 1 shows the mobile terminal as having various components, but it should be understood that implementing all of the illustrated components is not a requirement. A greater or smaller number of components may alternatively be implemented.

The elements of the mobile terminal will be described in detail as follows.

The wireless communication unit 110 may receive information related to an icon via a network (e.g., a mobile communication network, a broadcast network, the Internet, or a short-range communication network). Also, the wireless communication unit 110 transmits data including information related to a merged icon to other terminals or to a network server. Also, the wireless communication unit 110 may transmit information related to the merged icon via a wireless Internet network or a mobile communication network.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, or a data broadcast signal. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and the broadcast associated information may be received by the mobile communication module 112.

The broadcast signal may exist in various forms. For example, the broadcast signal may exist in the form of an electronic program guide (EPG) of digital multimedia broadcasting (DMB), or electronic service guide (ESG) of digital video broadcast-handheld (DVB-H).

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB T). The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 or another type of storage medium.

The mobile communication module 112 transmits and/or receives radio signals to and/or from at least one of a base station (e.g., access point or Node B), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include WLAN (Wireless LAN), Wi-Fi®, Wibro (Wireless broadband), Wimax (World Interoperability for Microwave Access), or HSDPA (High Speed Downlink Packet Access).

The short-range communication module 114 is a module for supporting short range communications. Some examples of short-range communication technology include Bluetooth™, Radio Frequency IDentification (RFID), Infrared Data Association (IrDA), and Ultra-WideBand (UWB), ZigBee™.

The location information module 115 is a module for checking or acquiring a location (or position) of the mobile terminal. For example, the location information module 115 may be embodied as a GPS (Global Positioning System) module.

With reference to FIG. 1, the A/V input unit 120 is configured to receive an audio or video signal. The NV input unit 120 may include a camera 121 (or other image capturing device) and a microphone 122 (or other sound pick-up device). The camera 121 processes image data of still pictures or video obtained by an image capturing device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, and a voice recognition mode, and can process the received sounds into audio data. The processed audio (voice) data may be converted for output into a format transmittable to a mobile communication base station (or other network entity) via the mobile communication module 112 when in the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal.

The user input unit 130 may receive a signal from the user for designating two or more icons among icons displayed according to an exemplary embodiment of the present invention. The signal for designating two or more icons may be received through a touch input or through a hard key and soft key input.

The user input unit 130 may receive an input for selecting a plurality of icons or a merged icon from the user. Also, the user input unit 130 may receive an input for generating an icon related to a function that can be performed by the mobile terminal from the user. In an exemplary embodiment of the present invention, in addition to icons previously set in manufacturing the mobile terminal 100 or an icon received via a network, the user can generate a desired icon and display the desired icon on a standby screen (i.e., idle screen).

The user input unit 130 may include a keypad, a dome switch, a touch pad (e.g., a touch sensitive member that detects changes in resistance, pressure, or capacitance in response to contact), a jog wheel, or a jog switch. In particular, the touch pad overlaid on the display unit 151 in a layered manner may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141, which will be described in association with the touch screen.

The interface unit 170 (or other connection means) serves as an interface by which at least one external device may be connected with the mobile terminal 100. For example, the interface unit 170 may include wired or wireless headset ports, an external power supply (or battery charger) ports, wired or wireless data ports, memory card ports, ports for connecting a device having an identification module, audio input/output (I/O) ports, video I/O ports, or earphone ports.

An identification module (not shown) may be a memory chip (or other element with memory or storage capabilities) that stores various information for authenticating a user's authority for using the mobile terminal 100 and may include a user identity module (UIM), a subscriber identity module (SIM), or a universal subscriber identity module (USIM). In addition, the device having the identification module (referred to as the 'identifying device', hereinafter) may take the form of a smart card. Accordingly, the identifying device may be connected with the terminal 100 via a port or other connection means.

In addition, when the mobile terminal 100 is connected with an external cradle, the interface unit 170 may serve as a conduit to allow power from the cradle to be supplied to the mobile terminal 100 or may serve as a conduit to allow various command signals input from the cradle to be transferred to the mobile terminal. Various command signals or power input from the cradle may operate as signals for recognizing when the mobile terminal is properly mounted on the cradle.

The output unit 150 is configured to provide outputs in a visual, audible, and/or tactile manner (e.g., audio signal, video signal, alarm signal, vibration signal). The output unit 150 may include the display unit 151, an audio output module 152, an alarm unit 153, and a haptic module 154.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading). When the mobile terminal 100 is in a video call mode or image capturing mode, the display unit 151 may display a captured image and/or received image, and a UI or GUI that shows videos or images and functions related thereto.

The display unit 151 may display a plurality of icons related to a certain function or a merged icon generated by merging designated icons among the plurality of icons on the idle screen image.

The idle screen image may be a screen image initially displayed when the user manipulates the mobile terminal 100. Information such as the amount of power of the mobile terminal 100, date, time, or a received signal strength indication (RSSI) may be displayed on the idle screen.

The icon may be related to a certain function provided by the mobile terminal. The icon may be implemented in the form of a graphic user interface (GUI). Icons related to the certain function may be implemented in the form of widgets.

The GUI or the widgets may function to display information. The information may include time or date of an area using different standard time from that of an area in which the mobile terminal 100 is located, a D-day, weather, a geographical feature, economy information (including the exchange rate, stock prices, and various economic indexes), a schedule, or search information (including search frequency information of each search word provided in a Web page of a search engine of the Internet).

The GUI or the widgets may function to guide the user to execute functions of the mobile terminal, such as functions related to a calculator, an e-dictionary, a scratch pad, alarm, schedule management, access to a previously designated Web page, a tool bar for Internet search, and a photo album.

The icons may be received via a network or may be previously stored in the mobile terminal 100.

The merged icon may be generated by merging two or more icons, or an icon with any merged icon. Merging of icons refers to displaying two or more designated icons or a merged icon as a single merged icon on the screen and associating a function related to the two or more merged icons with the displayed merged icon.

Associating a function related to the two or more merged icons with the merged icon means that when the merged icon is selected, the mobile terminal performs the function associated with the merged icon.

The location or the size of the plurality of icons or the merged icon displayed on the display unit 151 may be changed on the screen by the user.

The display unit 151 may display the merged icon on an area smaller than the sum of the areas of the two or more designated icons displayed on the idle screen.

When a plurality of icons are displayed on the idle screen, icons with a low use frequency are merged to generate a merged icon, and the area of the merged icon on the screen is set to be smaller than the sum of the areas of the designated icons, to thereby lower the area ratio of the icons on the idle screen. Thus, the idle screen can be effectively used.

The display unit 151 may demerge the merged icon into two or more icons and display the two or more icons according to a user selection. The separately displayed two or more icons may be the two or more icons previously designated to generate the merged icon.

The display unit 151 may include at least a Liquid Crystal Display (LCD), a Thin Film Transistor-LCD (TFT-LCD), an Organic Light Emitting Diode (OLED), a flexible display or a three-dimensional (3D) display. The display may be configured to be transparent to allow viewing of the exterior therethrough, which may be called a transparent display. A typical transparent display may be, for example, a TOLED (Transparent Organic Light Emitting Diode). The rear structure of the display unit 151 may include a light transmissive structure. With such a structure, the user can view an object located at a rear side of the terminal body through the region occupied by the display unit 151 of the terminal body.

The mobile terminal 100 may include two or more display units 151 according to its embodiment. For example, a plurality of display units 151 may be separately or integrally disposed on one surface or disposed on both surfaces of the mobile terminal.

When the display unit 151 and a sensor (referred to as a 'touch sensor', hereinafter) are overlaid in a layered manner (referred to as a 'touch screen', hereinafter), the display unit 151 may be used as both an input device and an output device. The touch sensor may have the form of, for example, a touch film, a touch sheet, or a touch pad.

The touch sensor may be configured to convert a pressure applied to a particular portion of the display unit 151 or a change in capacitance at a particular portion of the display unit 151 into an electrical input signal. The touch sensor may be configured to detect the pressure when a touch is applied as well as to detect a touched position or area.

When a touch with respect to the touch sensor is received, a corresponding signal(s) is transmitted to a touch controller. The touch controller processes the signal(s) and transmits corresponding data to the controller 180. Thus, the controller 180 can recognize which portion of the display unit 151 has been touched.

With reference to FIG. 1, a proximity sensor 141 may be located within the mobile terminal and covered by the touch screen or located near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

Examples of the proximity sensor 141 are a transmission type photo sensor, a direct reflection type photo sensor, a mirror-reflection type photo sensor, an RF oscillation type proximity sensor, a capacitance type proximity sensor, a magnetic proximity sensor, and an infrared proximity sensor. When the touch screen is an electrostatic type touch screen, an approach of a pointer is detected based on a change in an electric field according to the approach of the pointer. In this case, the touch screen (touch sensor) may be classified as a proximity sensor.

In the following description, for the sake of brevity, recognition of the pointer positioned to be close to the touch screen without contacting the touch screen will be called a 'proximity touch', while recognition of actual contact of the pointer with the touch screen will be called a 'contact touch'. When the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, or a proximity touch movement state), and information corresponding to the detected proximity touch operation and the proximity touch pattern can be output to the touch screen.

The audio output module 152 may output audio data received from the wireless communication unit 110 or stored in the memory 160 in a call signal reception mode, a call mode, a record mode, a voice recognition mode, and a broadcast reception mode. Also, the audio output module 152 may provide audible outputs related to a particular function (e.g., a call signal reception sound, a message reception sound) performed in the mobile terminal 100. The audio output module 152 may include a receiver, a speaker or a buzzer.

The alarm unit 153 outputs a signal for indicating an occurrence of an event of the mobile terminal 100. Events generated in the mobile terminal may include call signal reception, message reception, key signal inputs, and a touch input. In addition to video or audio signals, the alarm unit 153 may output signals in a different manner, for example, to indicate an occurrence of an event. The video or audio signals may also be output via the audio output module 152. Therefore, the display unit 151 and the audio output module 152 may be classified as parts of the alarm unit 153.

A haptic module 154 generates various tactile effects the user may feel. A typical example of the tactile effects generated by the haptic module 154 is vibration. The strength and pattern of the vibration can be controlled. For example, different vibrations may be combined to be output or sequentially output.

In addition to vibration, the haptic module 154 may generate various other tactile effects. The various other tactile effects may include an effect of stimulation by a pin arrangement vertically moving with respect to a contact skin, a spray force or suction force of air through a jet orifice or a suction opening, a contact on the skin, a contact of an electrode, or electrostatic force, or an effect of reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video) that are input or output. In addition, the memory 160 may store data regarding various patterns of vibrations and audio signals output when a touch is received on the touch screen.

The memory 160 may store information related to an icon or a merged icon according to an exemplary embodiment of the present invention. The information related to the icon or the merged icon may include graphic information for displaying the icon or the merged icon on the screen, and information regarding functions related to the icon or the merged icon.

The memory 160 may store information related to an icon generated through the user input unit 130 or a merged icon generated by merging a plurality of icons.

The memory 160 may include at least one type of storage medium including a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 via the Internet.

The controller 180 typically controls the general operations of the mobile terminal. For example, the controller 180 performs controlling and processing associated with voice calls, data communications, and video calls. The controller 180 may include a multimedia module 181 for reproducing multimedia data. The multimedia module 181 may be configured within the controller 180 or may be configured to be separate from the controller 180.

The controller 180 may perform pattern recognition processing to recognize a handwriting input or a picture drawing input performed on the touch screen as characters or images.

The controller 180 may merge a plurality of icons designated by the user to generate a merged icon. The controller 180 may control the display unit 151 to display the merged icon.

When the merged icon is selected by the user, the controller 180 may perform two or more functions related to two or more icons designated for generating the merged icon. The two or more icons designated for generating the merged icon may include a merged icon. Thus, the two or more functions related to the designated two or more icons may include functions related to another two or more icons designated to generate the merged icon.

The power supply unit 190 receives external power or internal power and supplies appropriate power required for operating elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, external elements of the mobile terminal will be described from the perspective of their functions with reference to FIGS. 2 and 3.

The mobile terminal may be implemented in a variety of different configurations. Examples of such configurations include folder-type, bar-type, swing-type, a slide type, as well as various other configurations. The following description will primarily relate to a slide-type mobile terminal. However, such description can equally apply to other types of mobile terminals.

Figure 2A:
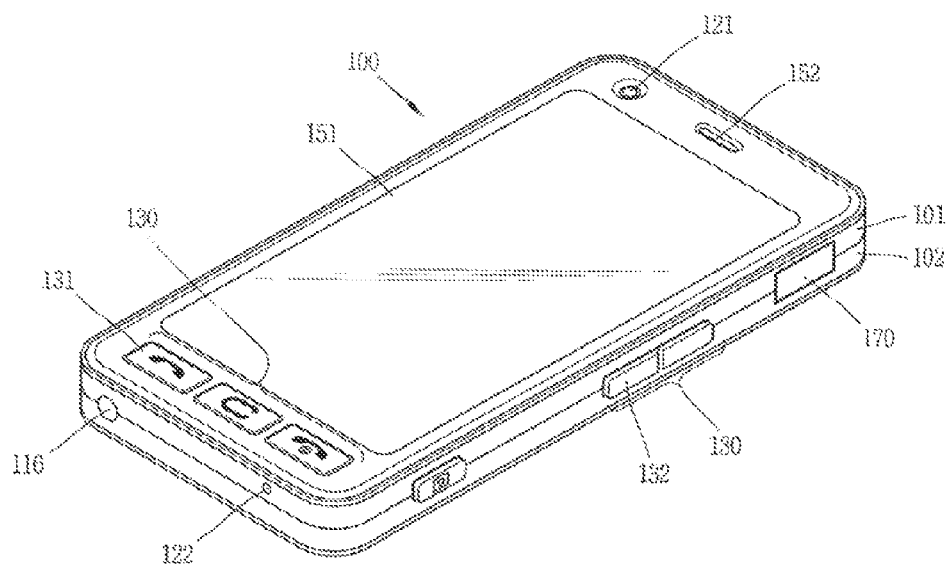
FIG. 2A is a front perspective view of a mobile terminal implementing an embodiment of the present invention.

FIG. 2A is a front perspective view of the mobile terminal according to an embodiment of the present invention.

The mobile terminal has a bar type terminal body. However, the present invention is not limited thereto and may be applicable to a slide type mobile terminal, a folder type mobile terminal, a swing type mobile terminal, or a swivel type mobile terminal, in which two or more bodies are combined to be relatively movable.

The body includes a case (or casing, housing, cover, etc.) constituting the external appearance. In this embodiment, the case may include a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, the user input unit 130, 131, 132, the microphone 122, and the interface unit 170 may be located mainly on the front case 101.

The display unit 151 occupies most of a circumferential surface of the front case 101. The audio output module 152 and the camera 121 are located at a region adjacent to one end portion among both end portions of the display unit 151, and the user input unit 131 and the microphone 122 are located at a region adjacent to another end portion. The user input unit 132 and the interface unit 170 may be located at the sides of the front case 101 and the rear case 102.

The user input unit 130 is manipulated to receive a command for controlling the operation of the mobile terminal 100 and may include a plurality of manipulation units 131 and 132. The manipulation units 131 and 132 may be generally referred to as a manipulating portion, and various methods and techniques can be employed for the manipulation portion so long as they can be operated by the user in a tactile manner.

Content input by the first and second manipulation units 131 and 132 can be variably set. For example, the first manipulation unit 131 may receive a command such as starting, ending, or scrolling, and the second manipulation unit 32 may receive a command such as controlling of the volume of a sound output from the audio output module 152 or conversion into a touch recognition mode of the display unit 151.

Figure 2B:
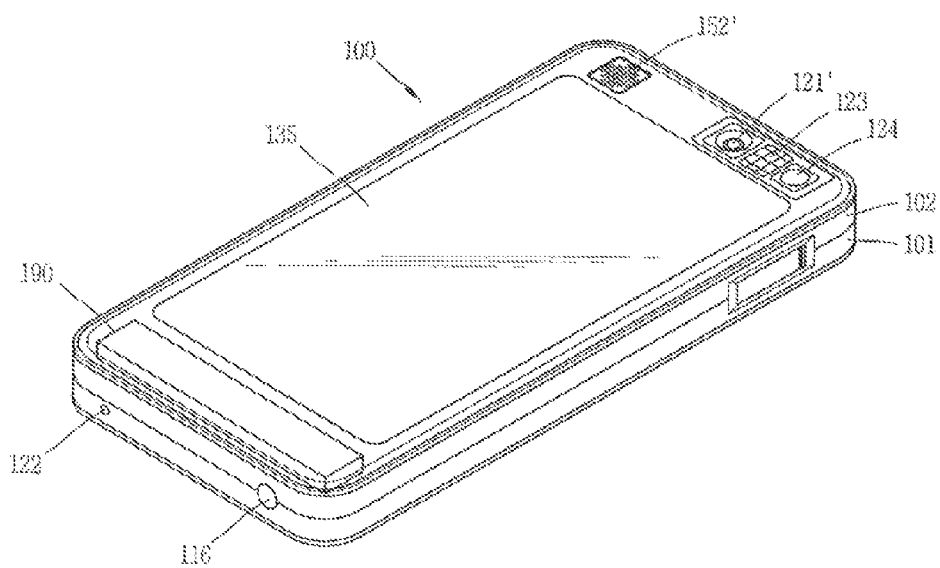
FIG. 2B is a rear perspective view of a mobile terminal implementing an embodiment of the present invention.

FIG. 2B is a rear perspective view of the mobile terminal as shown in FIG. 2A.

With reference to FIG. 2B, a camera 121' may additionally be located on the rear surface of the terminal body, specifically, on the rear case 102. The camera 121' may have an image capture direction which is substantially opposite to that of the camera 121 (See FIG. 2A), and have a different number of pixels than the camera 121.

For example, the camera 121 may have a smaller number of pixels to capture an image of the user's face and transmit the image to another party, and the camera 121' may have a larger number of pixels to capture an image of a general object and not immediately transmit the image in most cases. The cameras 121 and 121' may be installed on the terminal body such that they can be rotatable or popped up.

A flash 123 and a mirror 124 may be additionally located adjacent to the camera 121'. When an image of a subject is captured with the camera 121', the flash 123 illuminates the subject. The mirror 124 allows the user to see himself when he wants to capture his own image (i.e., self-image capturing) by using the camera 121'.

An audio output module 152' may be additionally located on the rear surface of the terminal body. The audio output module 152' may implement stereophonic sound functions in conjunction with the audio output module 152 (See FIG. 2A) and may be also used for implementing a speaker phone mode for call communication.

A broadcast signal receiving antenna 124 may be located at the side of the terminal body, in addition to an antenna (not shown) that is used for mobile communications. The antenna 124 constituting a portion of the broadcast receiving module 111 (See FIG. 1) can also be configured to be retractable from the terminal body.

The power supply unit 190 for supplying power to the mobile terminal 100 is mounted on the terminal body. The power supply unit 190 may be installed within the terminal body or may be directly attached to or detached from the exterior of the terminal body.

A touch pad 135 for detecting a touch may be additionally mounted on the rear case 102. The touch pad 135 may be configured to be light transmissive in the same manner as the display unit 151. In this case, when the display unit 151 is configured to output visual information from both sides of the terminal body, the visual information may be recognized also via the touch pad 135. The information output from both sides of the terminal body may be controlled by the touch pad 135. Alternatively, a display may be additionally mounted on the touch pad so that a touch screen may also be provided on the rear case 102.

The touch pad 135 is operated in association with the display unit 151 of the front case 101. The touch pad 135 may be located parallel to and on the rear side of the display unit 151. The touch pad 135 may have the same size as the display unit 151 or smaller.

The associated operation method of the display unit 151 and the touch pad 135 will now be described with reference to FIGS. 3A and 3B.

Figure 3A:
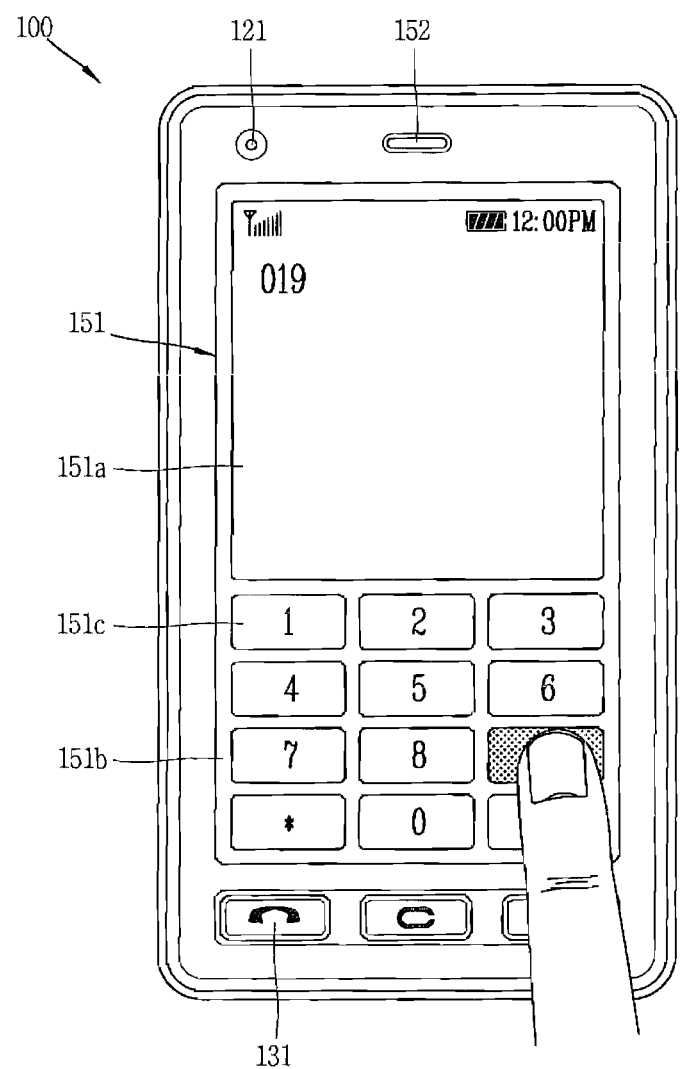

FIGS. 3A and 3B are front views of the mobile terminal for explaining an operation state of the mobile terminal according to the present invention.

Various types of visual information may be displayed on the display unit 151. The information may be displayed in the form of character, number, symbol, graphic, or icon. In order to input the information, at least one of the character, number, symbol, graphic and icon is displayed in a certain arrangement so as to be implemented in the form of a keypad. Such keypad may be a so-called 'soft key' keypad.

FIG. 3A shows receiving a touch applied to a soft key on the front surface of the terminal body.

The display unit 151 may be operated as a whole region or may be divided into a plurality of regions and accordingly operated. In the latter case, the plurality of regions may operate in association with each other.

For example, an output window 151a and an input window 151b may be displayed at upper and lower portions of the display unit 151, respectively. Soft keys 151c including numbers for inputting a phone number or other information are displayed on the input window 151b. When a soft key 151c is touched, a number corresponding to the touched soft key is displayed on the output window 151a. When the first manipulation unit 131 is manipulated, a call connection with respect to a phone number displayed on the output window 151a is attempted.

FIG. 3B shows receiving of a touch applied to the soft key through the rear surface of the terminal body. FIG. 3A shows a portrait in which the terminal body is disposed vertically and FIG. 3B shows a landscape in which the terminal body is disposed horizontally. The display unit 151 may be configured to convert an output screen image according to the direction of the terminal body.

FIG. 3B shows an operation of a text input mode in the mobile terminal. An output window 151a' and an input window 151b' are displayed on the display unit 151. A plurality of soft keys 151c' including at least characters, symbols or numbers may be arranged on the input window 151b'. The soft keys 151c' may be arranged in the form of Qwerty keys.

When the soft keys 151c' are touched through the touch pad 135 (See FIG. 2B), characters, numbers, or symbols corresponding to the touched soft keys are displayed on the output window 151a'. Compared with a touch input via the display unit 151, a touch input via the touch pad 135 can advantageously prevent the soft keys 151c' from being covered by a user's fingers when touching is performed. When the display unit 151 and the touch pad 135 are formed to be transparent, the user's fingers on the rear surface of the terminal body can be viewed so the touch input can be more accurately performed.

Besides the input methods presented in the above-described embodiments, the display unit 151 or the touch pad 135 may be configured to receive a touch through scrolling. The user may move a cursor or a pointer positioned on an entity, such as an icon, displayed on the display unit 151 by scrolling the display unit 151 or the touch pad 135. In addition, when the user moves his fingers on the display unit 151 or the touch pad 135, the path along which the user's fingers move may be visually displayed on the display unit 151. This would be useful in editing an image displayed on the display unit 151.

One function of the terminal may be executed when the display unit 151 (touch screen) and the touch pad 135 are touched together within a certain time range. The touches may include clamping the terminal body with the user's thumb and index finger. The function may be, for example, activation or deactivation of the display unit 151 or the touch pad 135.

Figure 4:
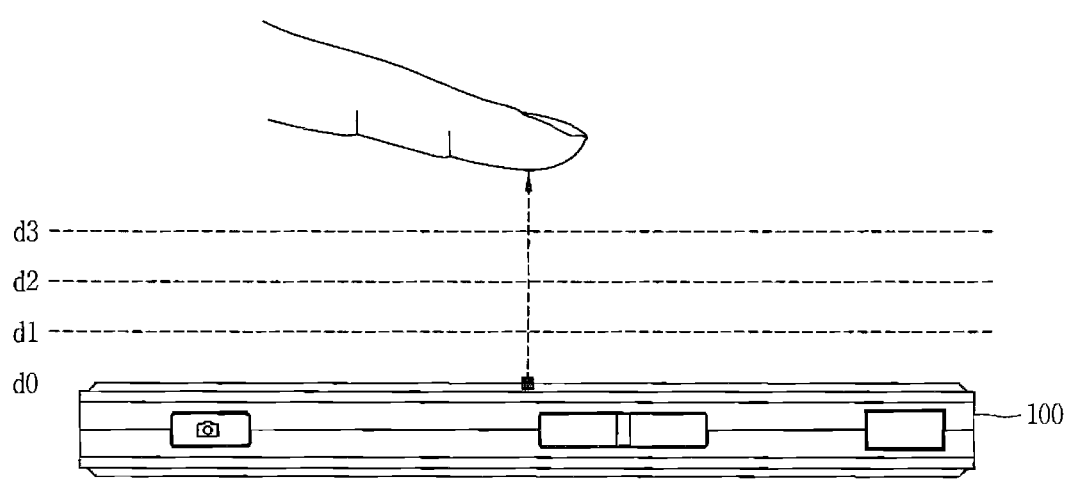
FIG. 4 is a conceptual view for explaining a proximity depth of a proximity sensor.

FIG. 4 is a conceptual view for explaining the depth of proximity of the proximity sensor.

The proximity sensor 141 will now be described in detail with reference to FIGS. 1 and 4.

As shown in FIG. 4, when a pointer, such as the user's finger or a pen, approaches the touch screen, the proximity sensor 141 located within or near the touch screen detects the pointer and outputs a proximity signal.

The proximity sensor 141 may be configured to output a different proximity signal according to the distance (referred to as a 'proximity depth', hereinafter) between the closely touched pointer and the touch screen.

FIG. 4 shows a section of the touch screen with the proximity sensor 141 for detecting, for example, three proximity depths. The proximity sensor may detect fewer or more proximity depths.

In detail, when the pointer is brought into contact with the touch screen d0, a contact touch is recognized. When the pointer is positioned to be spaced apart by shorter than a distance d1 from the touch screen, a proximity touch with a first proximity depth is recognized. If the pointer is positioned to be spaced apart by a distance equal to or longer than the distance d1 but shorter than a distance d2 from the touch screen, a proximity touch with a second proximity depth is recognized. If the pointer is positioned to be spaced apart by a distance equal to or longer than the distance d2 but shorter than a distance d3 from the touch screen, a proximity touch with a third proximity depth is recognized. If the pointer is positioned to be spaced apart by a distance equal to or longer than the distance d3 from the touch screen, no proximity touch is recognized.

Accordingly, the controller 180 may recognize the proximity touches as various input signals according to the proximity depths and proximity positions of the pointer, and may control various operations according to the various input signals.

Exemplary embodiments of the present invention will now be described with reference to the accompanying drawings. The present invention is to implement functional applications (referred to as 'widgets', hereinafter) in the form of icons such that they are merged (i.e. combined or consolidated) or demerged (i.e. divided or separated), and implement a method for managing the display of widgets.

FIGS. 5A to 5D are overviews of display screens illustrating merged icons in the mobile terminal according to an exemplary embodiment of the present invention.

Figure 5A:
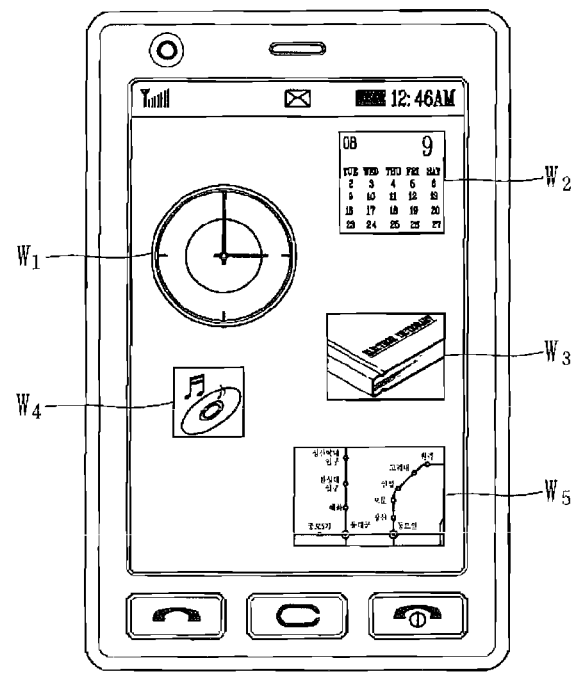
FIGS. 5A to 5D are overviews of display screens illustrating merged icons in the mobile terminal according to an exemplary embodiment of the present invention.

As shown in FIG. 5A, a plurality of icons W1, W2, W3, W4, and W5 may be displayed on the display unit 151 of the mobile terminal 100. The icons may be related to functions such as displaying time (W1), displaying a calendar (W2), activating the function of an e-dictionary of the mobile terminal (W3), activating a music play function of the mobile terminal (W4), or guiding subway lines (W5).

Figure 5B:
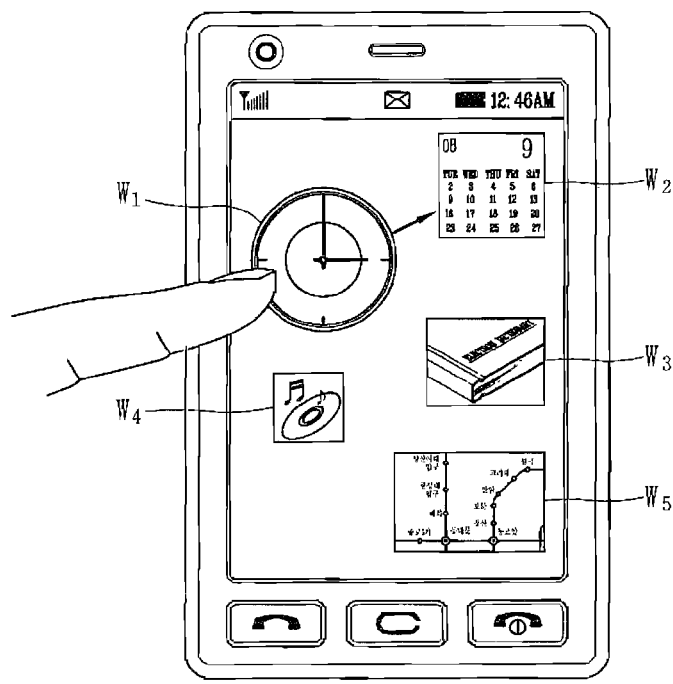

As shown in FIG. 5B, the mobile terminal 100 may receive an input for selecting at least one (W1) of the plurality of icons displayed on the screen from the user. As shown in FIG. 5B, the input for selecting at least one icon W1 may be a touch input. Alternatively, the input for selecting at least one icon W1 may be received by using a keypad, a dome switch, a touch pad (e.g., a touch sensitive member that detects changes in resistance, pressure, or capacitance in response to contact) a jog wheel, or a jog switch.

The user may select at least one icon W2 to be merged with the previously selected icon W1.

FIG. 5B illustrates that icon W2 is selected by dragging icon W1, which was first selected by the user, and merged. In addition, a touch input may be simultaneously applied to select a plurality of icons desired to be merged.

The plurality of icons selected by the user to generate a merged icon may be simultaneously selected, or may be sequentially selected as shown in FIG. 5B.

Three or more icons may be selected by the user in order to generate a merged icon.

Figure 5C:
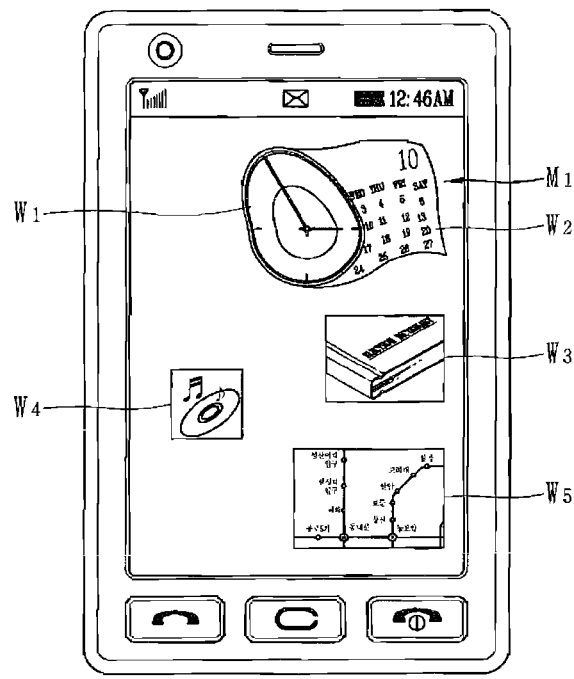

As shown in FIG. 5C, the mobile terminal 100 may display the status of merging the plurality of icons W1 and W2 selected by the user. The status of merging the plurality of icons W1 and W2 may be displayed by using an icon M1.

Figure 5D:
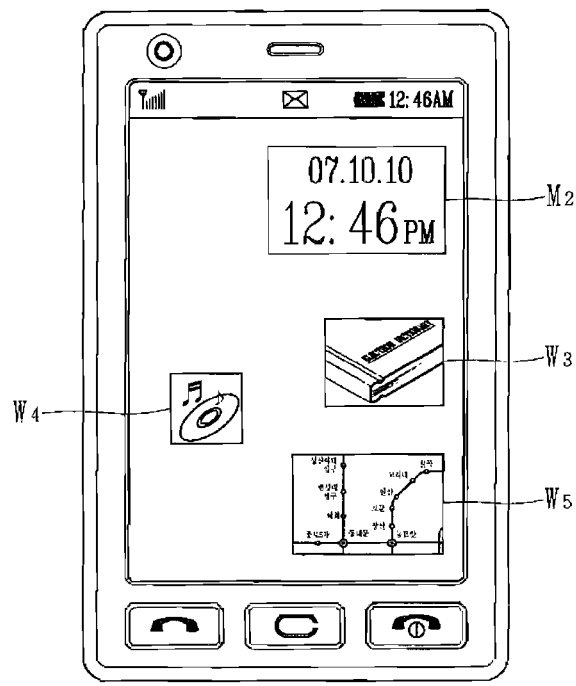

As shown in FIG. 5D, the mobile terminal 100 may display a merged icon M2 on the screen. The merged icon M2 may perform two or more functions related to the two or more icons designated to generated the merged icon.

For example, it is assumed that the icon W1 displaying time and the icon W2 displaying a calendar have been selected in order to generate the merged icon M2.

In this case, as shown in FIG. 5D, the merged icon M2 may display both time and date. The shape of the merged icon M2 may be stored in the memory 160 or may be displayed by using data received by the wireless communication unit 110 via a network.

For another example, when two applications have already been performed, if a user activates other application by selecting another widget, two widgets related to the two performed applications are merged and then displayed on at least part of the display. The display may further display a portion of the other application.

At this time, an operation of the two performed applications may be stopped. The merged widgets may be a lower layer menu of a specific menu.

Figure 6A:
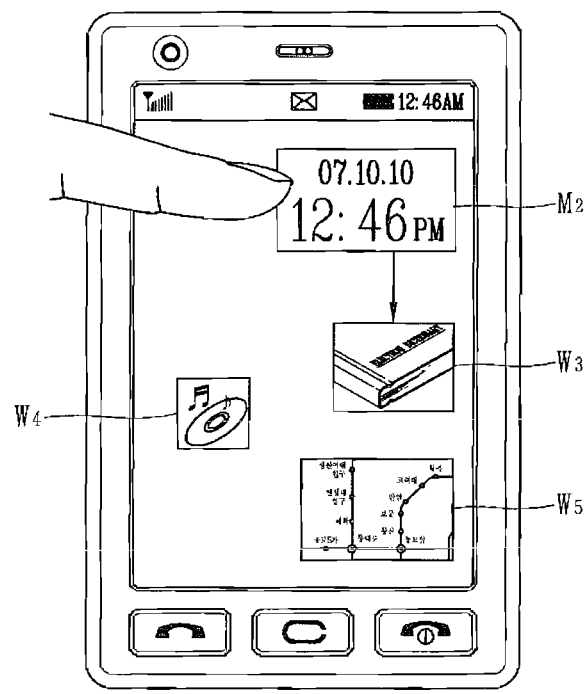
FIGS. 6A to 6C are overviews of display screens illustrating merging of an already combined icon with another icon and displaying the further merged icon in the mobile terminal according to an exemplary embodiment of the present invention.
Figure 6B:
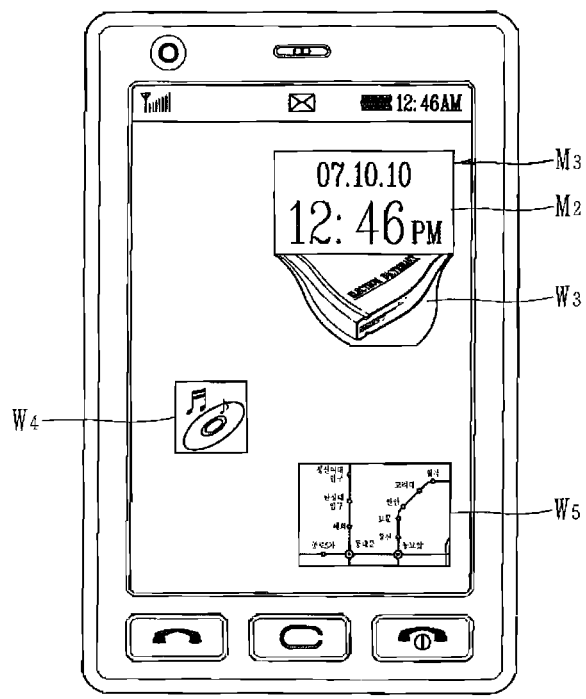
Figure 6C:
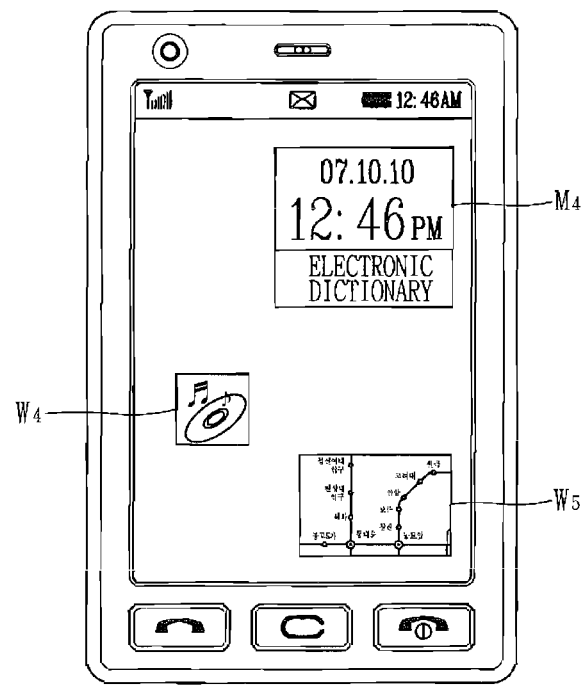

FIGS. 6A to 6C are overviews of display screens illustrating merging of an already merged icon with another icon and displaying the new merged icon in the mobile terminal according to an exemplary embodiment of the present invention.

The plurality of icons selected to be merged may include an already merged icon.

As shown in FIG. 6A, in order to generate a merged icon, the mobile terminal may receive an input for selecting the previously merged icon M2 from the user.

The user may drag the initially merged icon M2 to the location of another icon W3, with which the initially merged icon M2 is to be merged.

As shown in FIG. 6B, the mobile terminal 100 may display the status of merging the plurality of icons M2 and W3 selected by the user. The status of merging the plurality of icons M2 and W3 can be expressed by displaying an icon M3.

As shown in FIG. 6C, the mobile terminal 100 may display the merged icon M4.

FIGS. 7A to 7D are overviews of display screens illustrating merging of one already merged icon and another already merged icon and displaying a new merged icon in the mobile terminal according to an exemplary embodiment of the present invention.

Figure 7A:
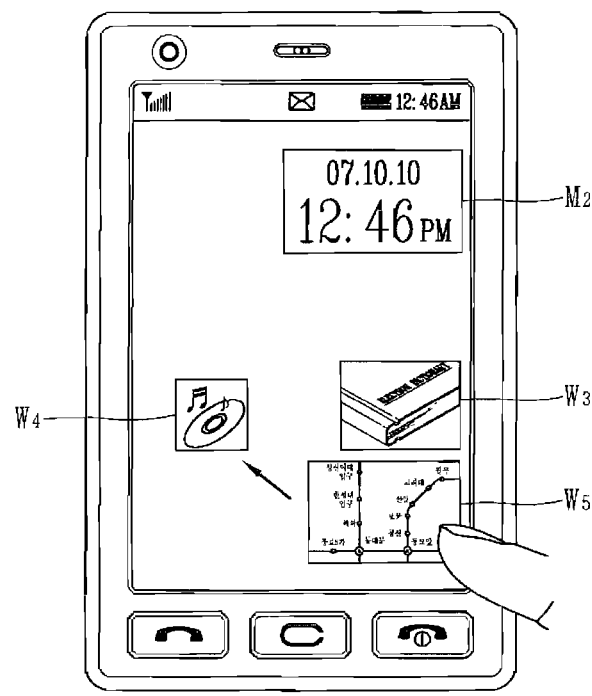
FIGS. 7A to 7D are overviews of display screens illustrating merging of one already merged icon and another already merged icon and displaying the further merged icon in the mobile terminal according to an exemplary embodiment of the present invention.

As shown in FIG. 7A, a plurality of icons W4 and W5 may be selected.

Figure 7B:
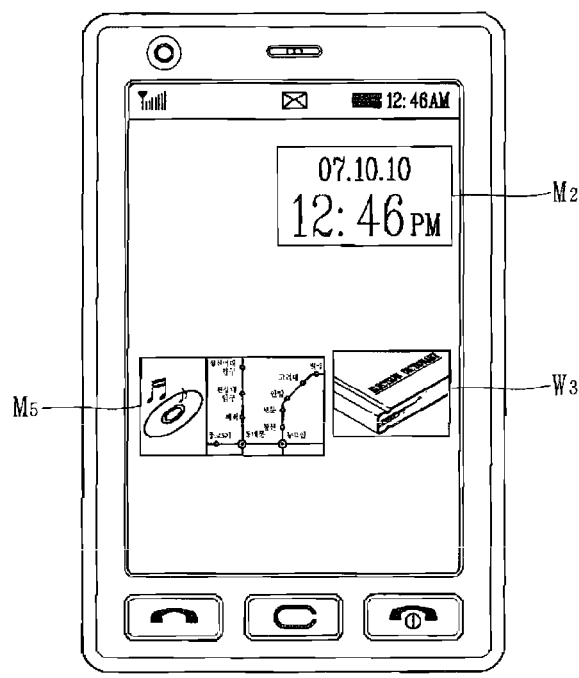

As shown in FIG. 7B, the mobile terminal may display a merged icon M5 in addition to the previously merged icon M2.

Figure 7C:
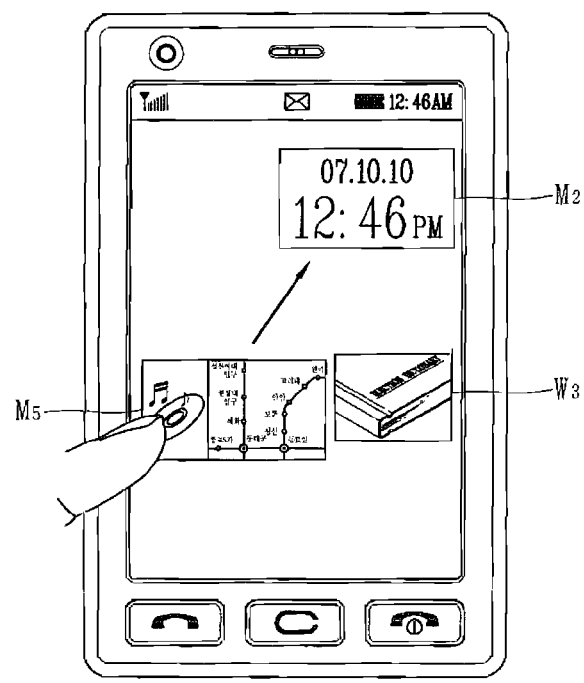

As shown in FIG. 7C, the mobile terminal 100 may receive an input for selecting the merged icon M5 different from the previously merged icon M2.

Figure 7D:
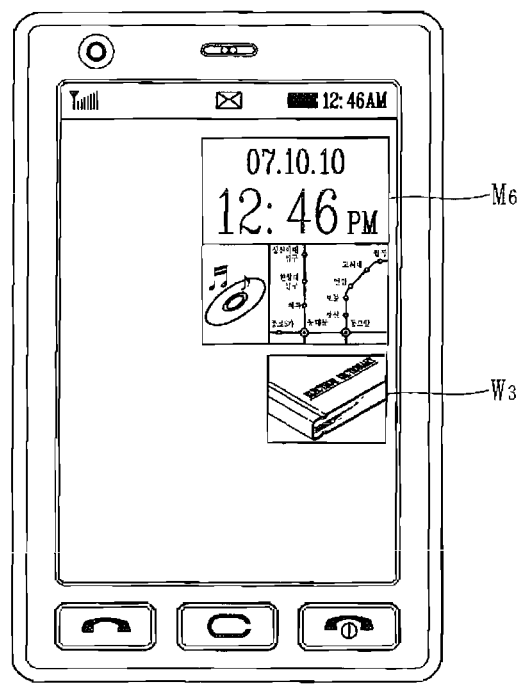

As shown in FIG. 7D, the mobile terminal may merge the previously merged icon M2 and newly merged icon M5 to generate a new merged icon M6 and display the merged icon M6 on the screen.

FIGS. 8A to 8D are overviews of display screens illustrating demerging icons in the mobile terminal according to an exemplary embodiment of the present invention.

Figure 8A:
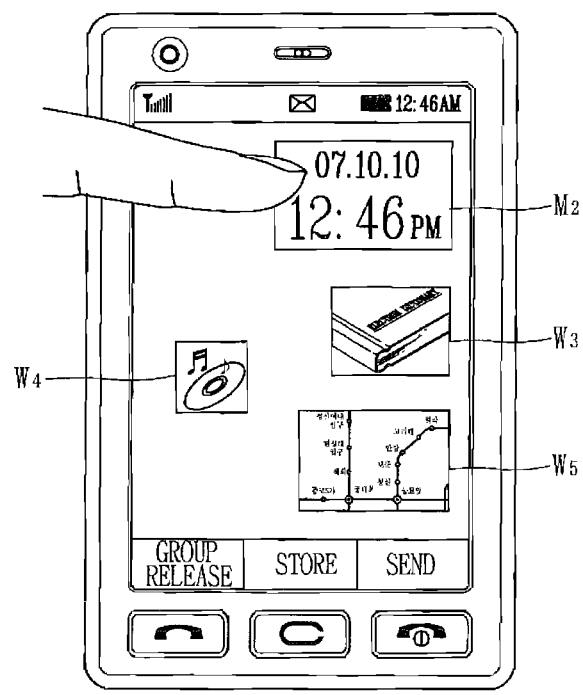
FIGS. 8A to 8D are overviews of display screens illustrating demerging icons in the mobile terminal according to an exemplary embodiment of the present invention.

As shown in FIG. 8A, the mobile terminal 100 may receive an input for selecting at least one merged icon M2 from among previously merged icons displayed on the screen. When the merged icon M2 is selected by the user, the mobile terminal may display a function applicable to the merged icon on the screen.

Figure 8B:
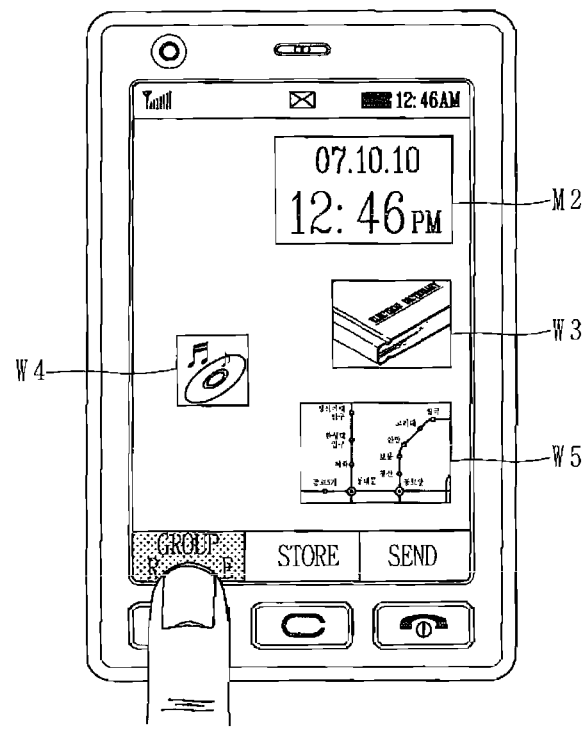

As shown in FIG. 8B, the mobile terminal 100 may receive an input for demerging the selected merged icon M2 from the user.

Figure 8C:
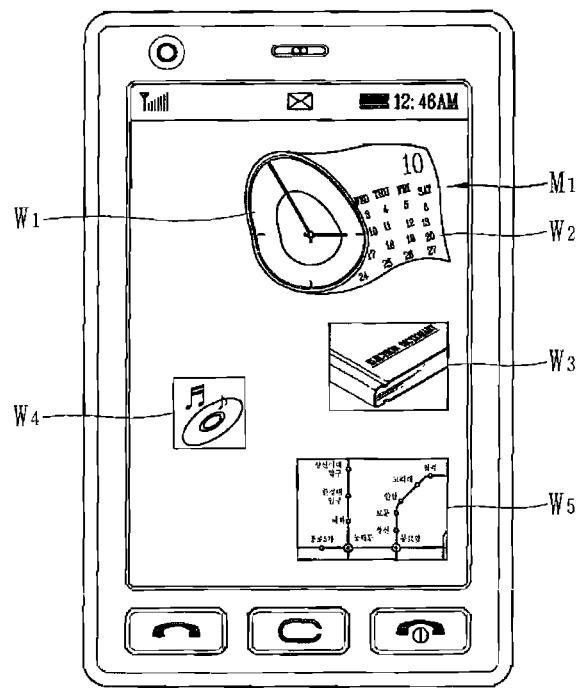

As shown in FIG. 8C, the mobile terminal 100 may display a status of demerging the merged icon M2 selected by the user. The status of demerging icon M2 may be expressed by displaying the icon M1.

Figure 8D:
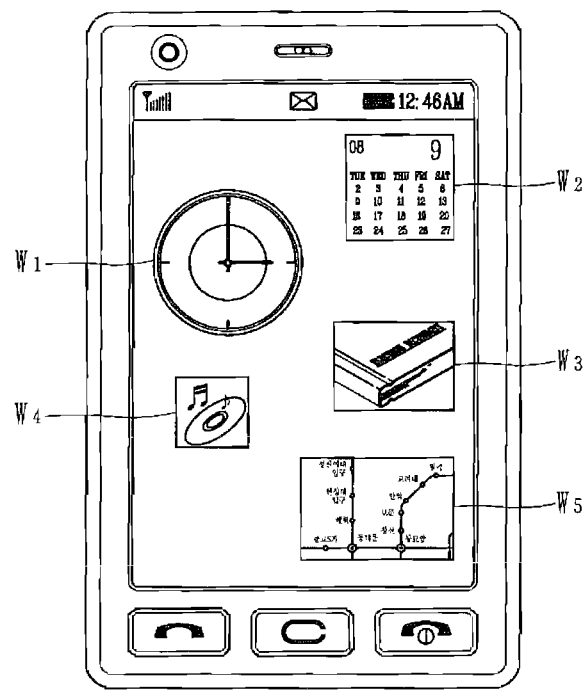

As shown in FIG. 8D, the mobile terminal 100 may display a plurality of demerged icons W1 and W2 on the screen. When the icons are separately displayed, the functions corresponding to the merged icons can be separated.

FIGS. 9A to 9D are overviews of display screens illustrating storing of information related to icons in the mobile terminal according to an exemplary embodiment of the present invention.

Figure 9A:
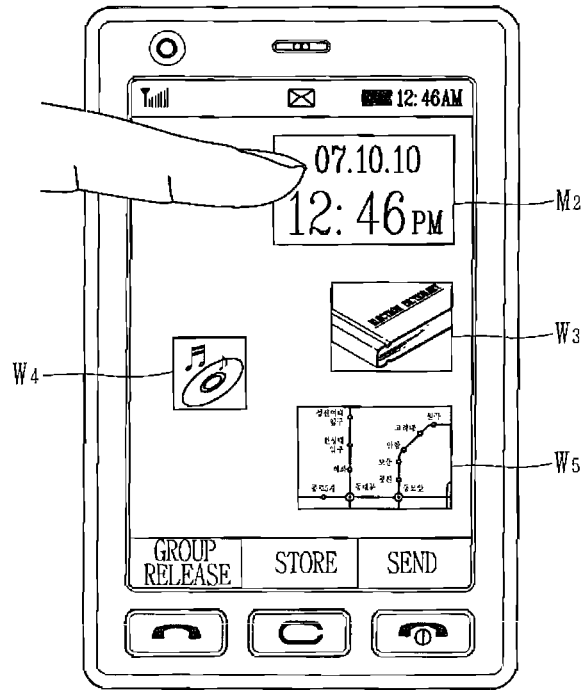
FIGS. 9A to 9D are overviews of display screens illustrating storing of information related to icons in the mobile terminal according to an exemplary embodiment of the present invention.

As shown in FIG. 9A, the mobile terminal 100 may receive an input for selecting at least one merged icon M2 from among a plurality of previously merged icons displayed on the screen. If at least one merged icon M2 is selected by the user, the mobile terminal can display a function applicable to the selected merged icon on the screen.

Figure 9B:
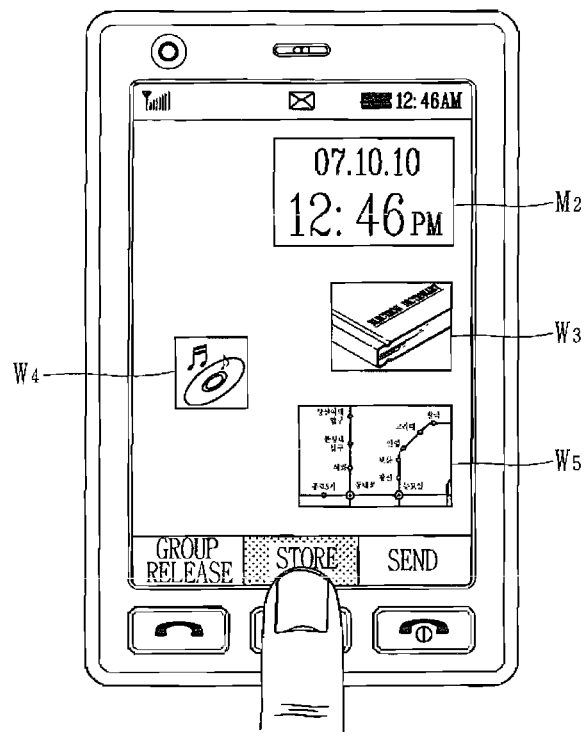

As shown in FIG. 9B, the mobile terminal 100 may receive an input for storing the selected merged icon M2 from the user.

When the input for storing the selected merged icon M2 is received, the mobile terminal 100 may store information about the selected merged icon M2 or an icon in the memory 160. The information may include at least graphic information, combination information of menus (applications), URL information related to a merged widget for displaying the icon or the merged icon on the screen or information regarding a function related to the icon or the merged icon.

The memory may be a SIM card.

Figure 9C:
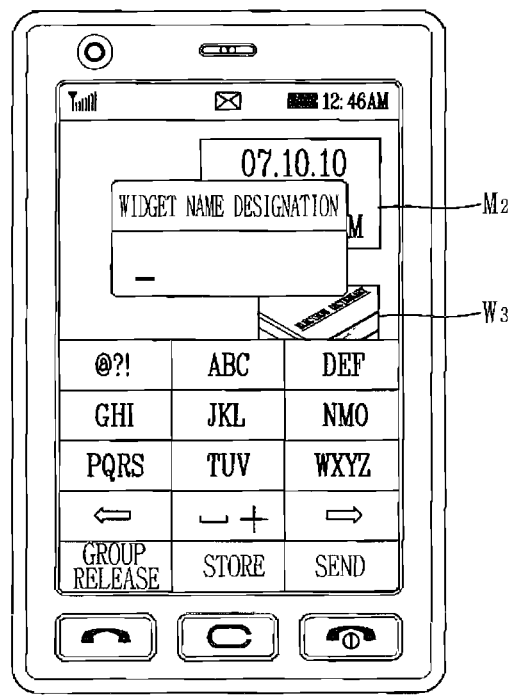

As shown in FIG. 9C, the mobile terminal 100 may receive a name for identifying information related to the icon or the merged icon. The name for identifying the information may include a file name.

Figure 9D:
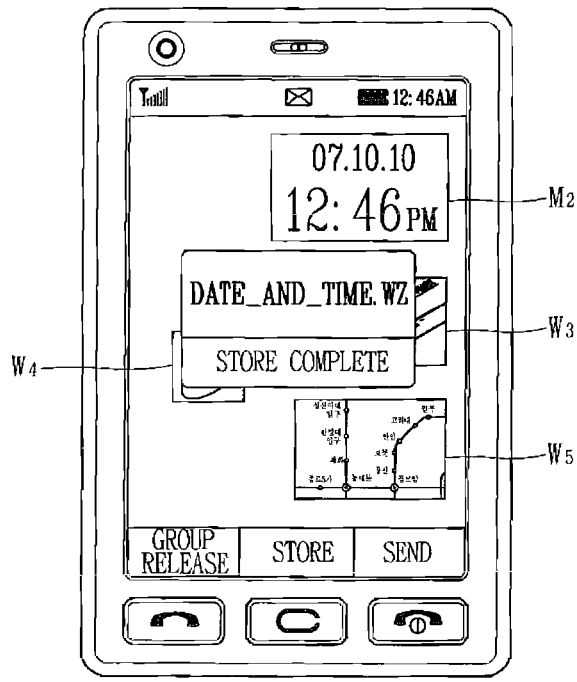

As shown in FIG. 9D, the mobile terminal 100 may display an indication on the screen that the information related to the icon or the merged icon has been stored in the memory 160.

FIGS. 10A to 10D are overviews of display screens illustrating transmission of information related to icons in the mobile terminal according to an exemplary embodiment of the present invention.

Figure 10A:
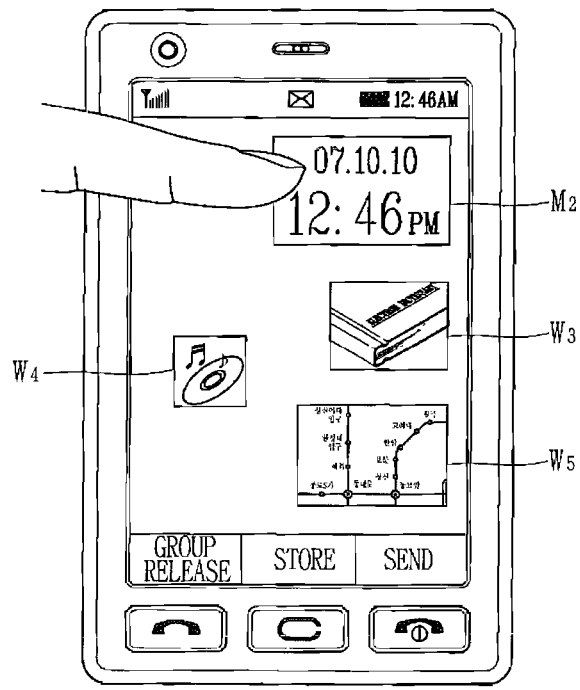
FIGS. 10A to 10D are overviews of display screens illustrating transmission of information related to icons in the mobile terminal according to an exemplary embodiment of the present invention.

As shown in FIG. 10A, the mobile terminal may receive an input for selecting at least one of the merged icons M2 displayed on the screen. When the at least one merged icon M2 is selected by the user, the mobile terminal may display a function applicable to the merged icon on the screen.

Figure 10B:
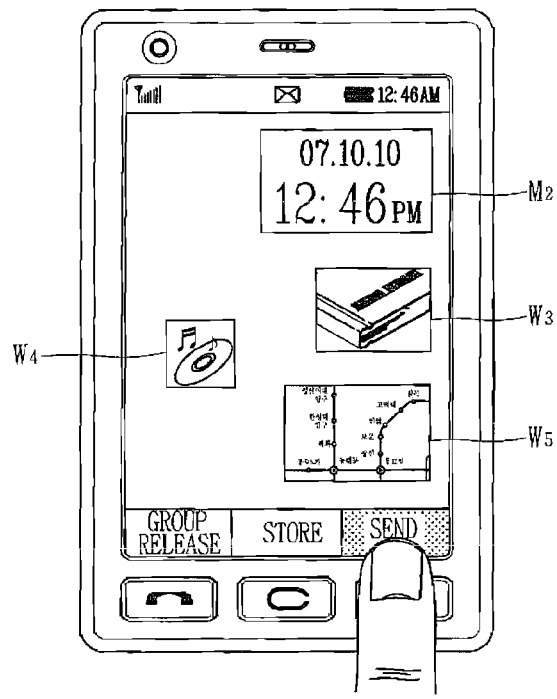

As shown in FIG. 10B, the mobile terminal 100 may receive an input for selecting transmission of the information related to the selected merged icon M2 from the user.

Figure 10C:
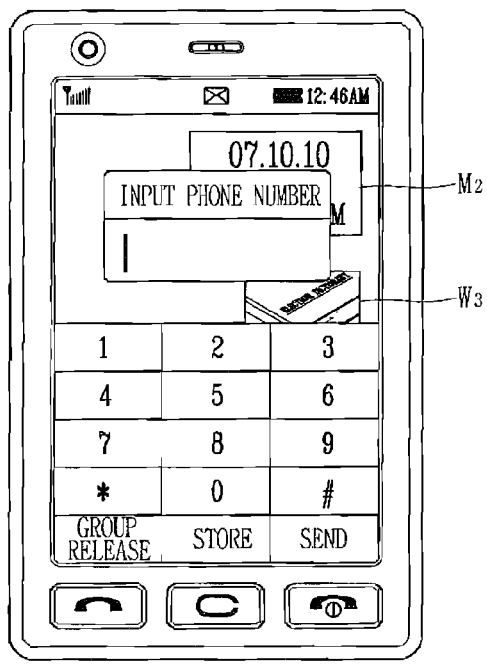

As shown in FIG. 10C, the mobile terminal 100 may receive an input from the user for designating a terminal to which the information related to the selected merged icon M2 is to be transmitted.

Figure 10D:
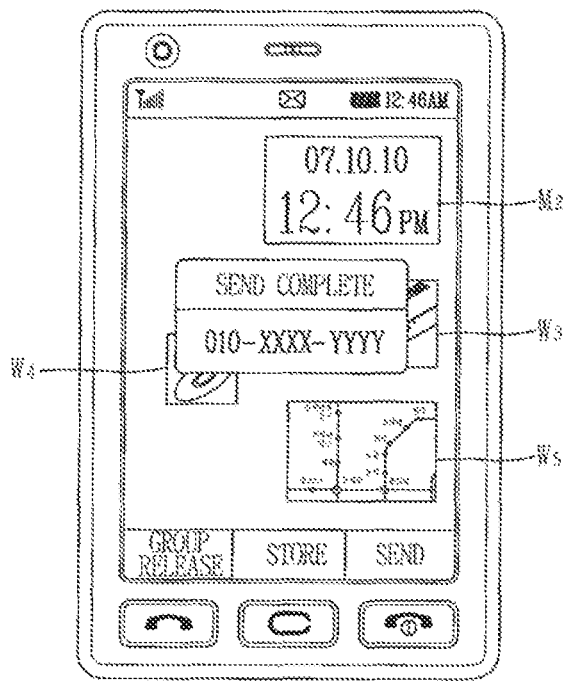

As shown in FIG. 10D, the mobile terminal 100 may display an indication on the screen that the information related to the selected merged icon M2 has been transmitted to the designated terminal.

The information related to the merged icon may include at least graphic information, combination information of menus (applications), URL information related to merged widgets for displaying the merged icon on the screen or information regarding a function related or the merged icon.

Figure 11:
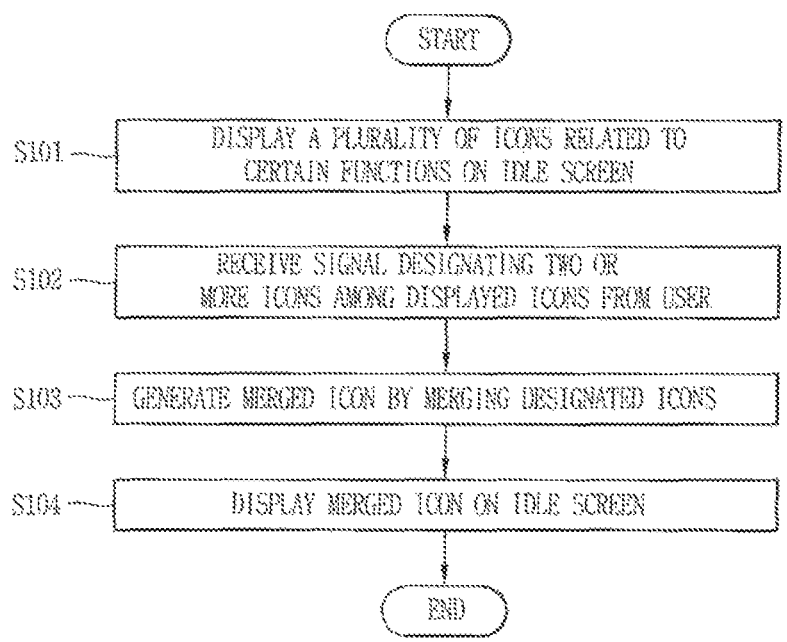
FIG. 11 is a flow chart illustrating a user interface method of the mobile terminal according to an exemplary embodiment of the present invention.

FIG. 11 is a flow chart illustrating a user interface method of the mobile terminal according to an exemplary embodiment of the present invention.

The mobile terminal 100 may display a plurality of icons related to certain functions on the idle screen (S101). The user may select two or more icons desired to be merged from among the plurality of icons displayed on the idle screen, and the mobile terminal may receive an input for selecting two or more icons from the user (S102).

The mobile terminal 100 may generate a merged icon by merging the designated icons (S103).

When the mobile terminal 100 generates the merged icon, the mobile terminal may display the generated merged icon on the idle screen (S104).

Examples of merging and demerging widgets and widget display methods and management in a physical aspect and in a visual aspect according to exemplary embodiments of the present invention will now be described.

The merging and demerging of widgets according to a first exemplary embodiment of the present invention will now be described.

FIGS. 12A to 12E are overviews of display screens illustrating merging and demerging of widgets each having a different theme.

A widget is a functional application that can be activated to execute various functions related to a mobile terminal. Such widgets may be in the form of a graphical icon (e.g. a shortcut button) with a related functional application already stored in the mobile terminal or newly downloaded from a network.

Figure 12A:
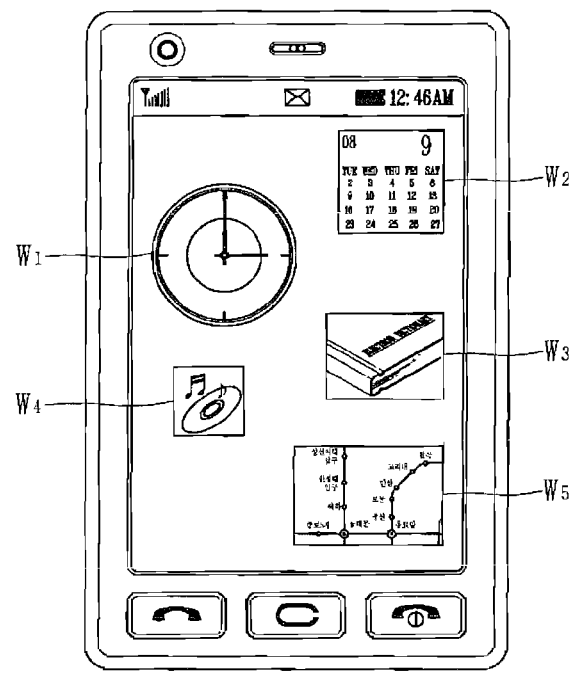
FIGS. 12A to 12F are overviews of display screens illustrating the merging and demerging of widgets each having a different theme.

As shown in FIG. 12A, in an exemplary embodiment of the present invention, various widgets for executing a time display (W1), a calendar display (W2), an e-dictionary (W3), a music player (W4), and a subway guide (S5) are displayed on the screen (i.e., the display unit 151) of the terminal. A user input for selecting a widget is received via the screen 151 and the corresponding function is executed. The user input for selecting the widget may be received via a keypad, a dome switch, a touch pad (e.g., a touch sensitive member that detects changes in resistance, pressure, or capacitance in response to contact), a jog wheel, or a jog switch.

Widget icons regarding a phone book (phone book, speed number, or group management), a voice call (dial or call list), a video call, a message, an alarm, a schedule, a setting/locking (screen, sound, touch, or lock), a camera (image capture or gallery), an MP3, a broadcast (TV) contents searcher, MT (multi-tasking), BT (Bluetooth™), Web/browser, viewer (text viewer or file viewer), e-dictionary, integrated data search, a subway line map, weather, stocks, or e-book update (update information regarding new book of the week, steady-seller or best seller), may be present on the idle screen of the mobile terminal.

Figure 12B:
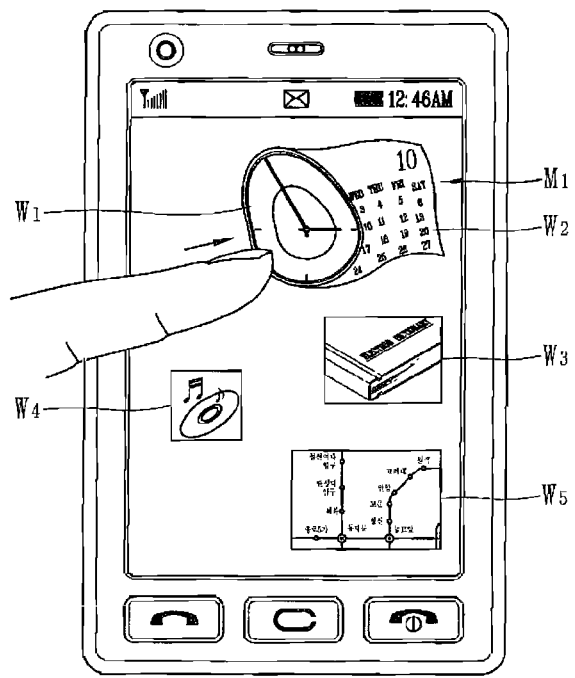

FIG. 12B illustrates merging of widgets.

As shown in FIG. 12B, at least two widget icons simultaneously selected by a multi-touch input may be dragged (e.g., collide) to be merged. In this case, the integrated icon generated from the merging may be displayed to have a changed form and may simultaneously select/display or select/execute at least two or more functions according to a user selection.

In the exemplary embodiment of the present invention, the user can easily recognize whether or not two widgets can be merged. If two widgets can be merged, the controller 180 may provide control such that a new-shaped widget appears or the shape of the widgets can be changed when the widgets overlap.

If two widgets cannot be merged, the controller 180 does not change the shape of the widgets. When a new widget is downloaded, the user may check which widgets can be merged with reference to widget installation information. In an exemplary embodiment of the present invention, three or more widgets may be merged.

Figure 12C:
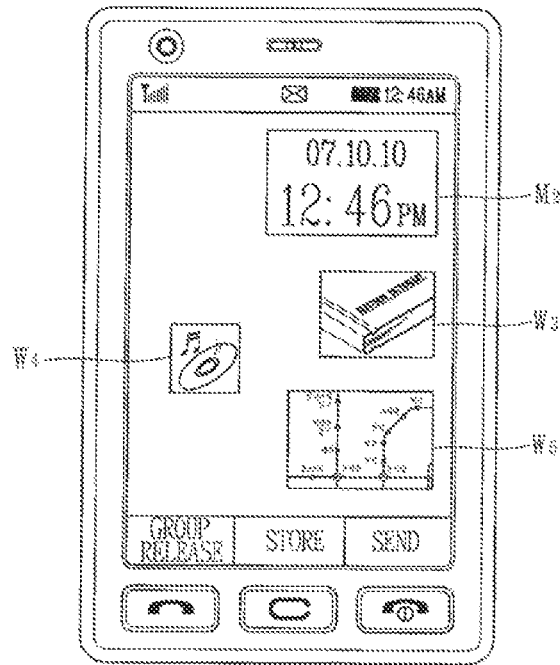
Figure 12D:
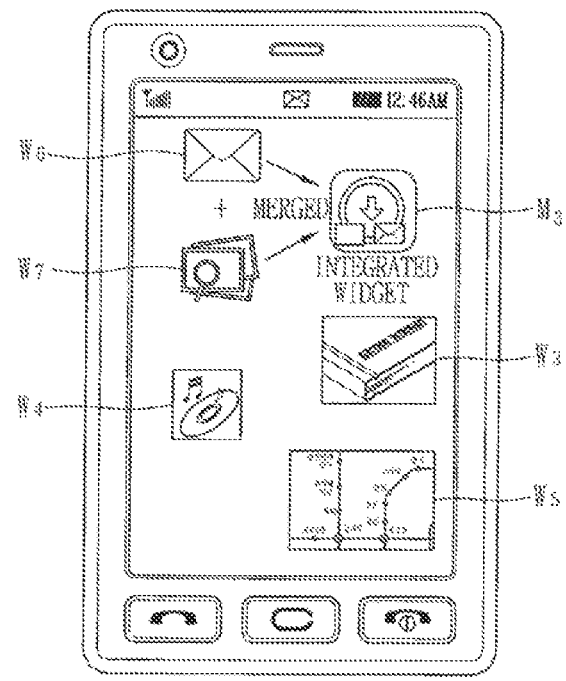

FIG. 12C illustrates an integrated widget M2 generated by merging a widget W1 having a clock display function and a widget W2 having a calendar display function. FIG. 12D illustrates an integrated widget M3 generated by merging a widget W6 having an e-mail transmission function and a widget W7 having a function of loading and displaying a file as displayed on the screen of the terminal.

The integrated widgets M2 and M3 perform not only the integrated functions generated through the merging but the function of the individual widgets of the integrated widget.

Figure 12E:
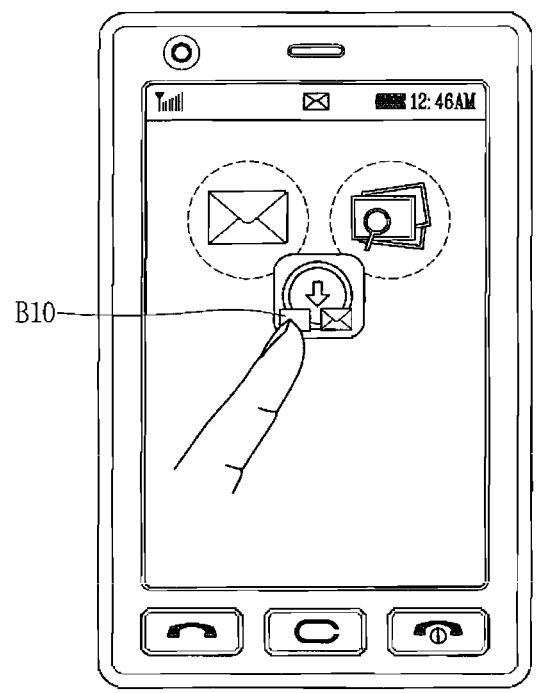
Figure 12F:
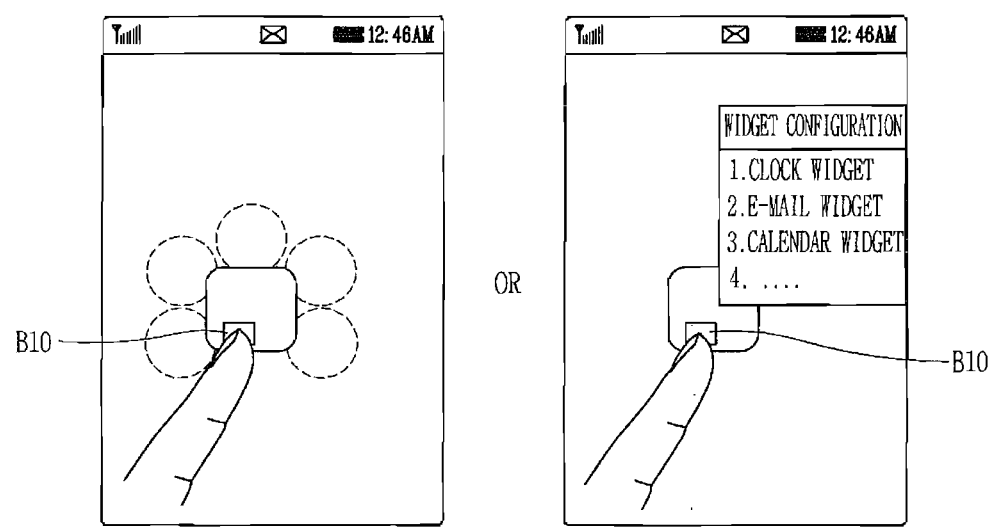

FIGS. 12E to 12F illustrate integrated widgets and a related management method.

As mentioned above, the integrated widget may perform an integrated function generated through the merging or execute the function of the individual widgets of the integrated widget according to a user selection.

In order to perform the function of the individual widgets, the integrated widget may include a button B10 as shown in FIG. 12E. When the button B10 is selected (touched), the controller 180 makes the individual widgets appear near the integrated widget, so that the user can select (or execute) the individual widgets. The controller 180 provides control such that the individual widgets near the integrated widget icon appears only while the button B10 is being touched.

In addition, the individual widgets near the integrated widget icon may appear during a certain time period and then disappear when the button B10 is touched.

Another embodiment of an integrated widget will now be described.

When an integrated widget icon is generated by merging a video call icon and a message icon and the user touches the integrated widget icon for a prolonged duration (i.e., for a long term), the controller 180 may execute a menu in which the user can perform text chatting during video call communicating whereby user can make conversation in real time with a counterpart of a video call or a third party by using messages or a messenger and content of exchanged text is accumulatively displayed on the screen. However, if the user touches the integrated widget icon for a short duration, the individual widget icons of the integrated widget icon may be discriminately displayed and one of the related menus may be selectively executed.

For another example, when an integrated widget icon is generated by merging a camera icon and a broadcast icon and the user touches the integrated widget icon for a long duration, the controller 180 may display a screen image for allowing for simultaneous execution of camera-related image capturing, a photo album view or a broadcast view. If, however, the user touches the integrated widget icon for a short duration, the individual widget icons of the integrated widget icon can be discriminately displayed and one of the related menus may be selectively executed.

For another example, when an integrated widget icon is generated by merging a weather icon, a calendar icon, and an e-book update icon, and the user touches the integrated widget icon for a long duration, the controller 180 may update relevant information of the individual icons constituting the merged integrated icon and display the updated information together on the screen. If, however, the user touches the integrated widget icon for a short duration, the individual widget icons of the integrated widget icon can be discriminately displayed and one of the related menus may be selectively executed.

For another example, when an integrated widget icon is generated by merging password-set widget icons (e.g., certain programs for which a password has been set) and the user touches the integrated widget icon for a long duration, the controller 180 may display a password input window and, when a corresponding password is input, the controller 180 may unlock all the merged icons. However, if the user touches the integrated widget icon for a short duration, the individual icons constituting the merged icon are discriminately displayed. When the user selects one of the menus of the individual icons, the controller 180 displays the password input window and, when a corresponding password is input, the controller executes the selected menu.

For another example, when an integrated widget icon is generated by merging a file viewer (e.g., a viewer allowing viewing of e-book contents) icon and an e-dictionary-related icon and the user touches the integrated widget for a long duration, the controller 180 may execute the function (menu) of each icon constituting the integrated merged icon. If the user wants to search for a word while reading particular contents, he may immediately check a search result through an e-dictionary function which is simultaneously executed. Meanwhile, when the user touches the integrated widget icon for a short duration, the individual widget icons constituting the integrated widget icon may be discriminately displayed and one of the related menus may be selectively executed.

For another example, when an integrated widget icon is generated by merging a camera icon and a schedule-related icon and the user touches the integrated widget for a long duration, the controller 180 may execute the functions (menus) of the individual icons constituting the merged integrated icon and add photo images captured through the camera function to a corresponding date of a schedule in synchronization with the date at which the images were captured. The user can immediately check the captured photo images according to the date through the schedule function, and view a screen image related to the schedule in synchronization with the capture date (or reception date) of a corresponding photo image. However, when the user touches the integrated widget icon for a short duration, the individual icons constituting the integrated widget icon may be discriminately displayed and one of the related menus may be selectively executed.

In each embodiment, the simultaneously executed menus may be displayed on a single screen in a divided manner, may be displayed in an overlaid manner in the form of a foreground or a background, or may be displayed in a dual-display window in a divided manner.

FIG. 12F illustrates an integrated widget generated by merging three or more widgets.

As shown in FIG. 12F, the controller 180 may display individual widgets around an icon or may display the individual widgets in the form of a pop-up list.

When a button B10 is selected (touched), the controller 180 displays the individual widgets as shown in FIG. 12F. The user may assign a priority level (or use frequency) to the individual widgets to designate locations of the individual widgets displayed around a widget icon.

The controller 180 may display a number of individual widgets constituting the corresponding integrated widget on the icon of the integrated widget. The user may recognize how many widgets have been merged into the corresponding integrated widget through the number displayed on the icon of the integrated widget.

If the user wants to demerge a particular widget from the integrated widget, the user may separate the corresponding widget from the integrated widget while the individual widgets appear around the icon of the integrated widget.

The user may conceal widgets with a low use frequency by merging widgets. Namely, the user may select and merge widgets with a low use frequency to implement a widget concealment function.

Figure 13:
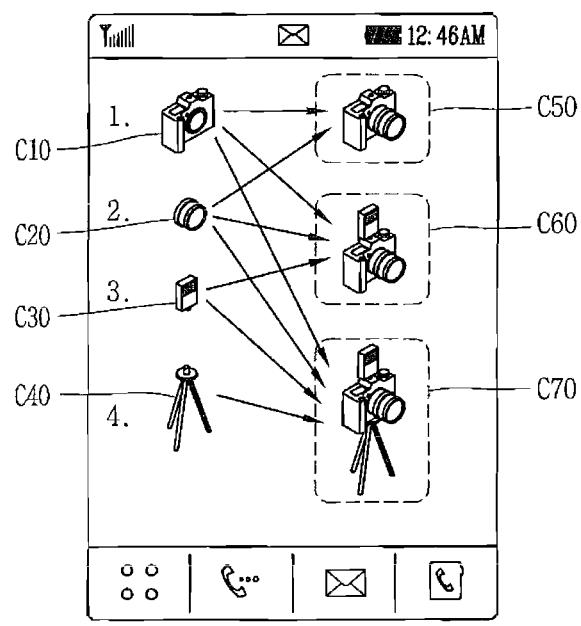
FIG. 13 is an overview of a display screen illustrating an example of the merging and demerging of widgets having particular themes.

FIG. 13 is an overview of a display screen illustrating an example of the merging and demerging of widgets having particular themes.

Merging and demerging of widgets each having a particular theme is similar to the cases illustrated in FIGS. 12A to 12F in that several widgets are combined (merged) to perform a single integrated function but different in that the merged individual widgets have a common theme (e.g., a camera function).

With reference to FIG. 13, when more than a certain number of widgets having a particular common theme are displayed, the controller 180 may combine the displayed widgets to perform an integrated function.

As shown in FIG. 13, an integrated widget that can be generated when four widgets (i.e., a body widget C10 with a theme of a camera function, a flash widget C20, a lens widget C30, and a tripod widget C40) are gathered. Whenever widgets are merged, the camera-related functions are combined. When the four widgets C10 to C40 are all merged, an integrated widget that performs a full camera function can be generated.

The body widget C10 provides a camera filter function for taking an image with a vintage touch such as a manual camera. The lens widget C20 provides a camera zoom (zoom-in or zoom-out) function such as a telephoto lens. The flash widget C30 provides a clear, bright camera filter function such as a flash of a camera. The tripod widget C40 provides a correction function for preventing hand-shaking such as if a tripod was used.

As shown in FIG. 13, when the lens widget C20 and the body widget C10 are merged, the merged integrated widget C50 has a camera zoom (zoom-in, zoom-out) function in addition to the camera filter function for taking an image with a vintage touch.

When the flash widget function C30 is merged with the integrated widget C50, the merged integrated widget C60 can have the clear, bright camera filter function such as a camera flash.

When the tripod widget C40 is merged into the integrated widget C60, the merged integrated widget C70 can provide a full camera function by additionally having the correction function for preventing hand-shaking.

The integrated widgets C50, C60, and C70 can be downloaded as a single package from a server. Also, the integrated widgets C50, C60, and C70 can be shared as a single package with other terminals.

Figure 14:
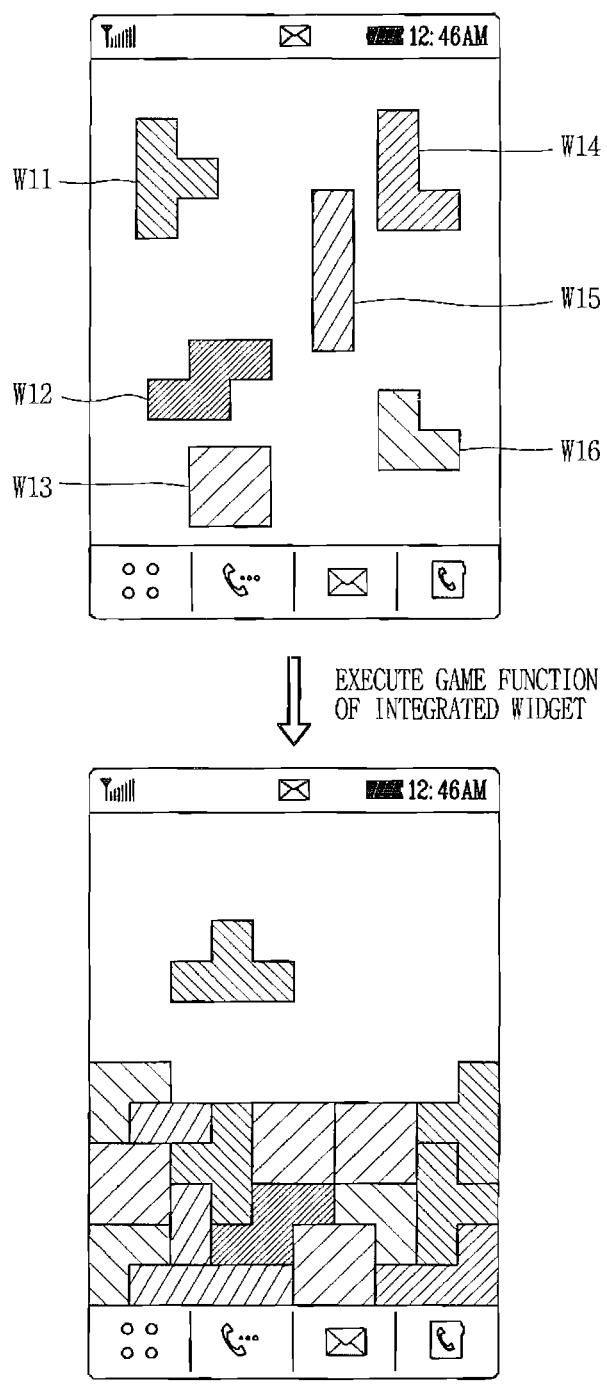
FIG. 14 is an overview of display screens illustrating another example of the merging and demerging illustrated in FIG. 13

FIG. 14 is an overview of display screens illustrating another example of the merging and demerging illustrated in FIG. 13. When more than a certain number of widgets having a particular common theme are displayed, the controller 180 may register and operate merged widgets in the form of applications and utilize the merged widgets as items of games (e.g., Tetris® or a combative sport game).

A Tetris® game will now be described as an example.

A Tetris game is a game with a simple principle of heaping pattern blocks each having a different shape.

A service provider may distribute or sell six widgets W11, W12, W13, W14, W15, and W16 having the same shape as the six figures constituting Tetris. The user may download the six widgets as a package, or may download the six widgets one-by-one from the service provider when required.

When the user collects and combines all the six widgets W11, W12, W13, W14, W15, and W16, an integrated widget available for executing the Tetris game can be created. Each function of the six widgets may have a common theme or may be completely different.

As shown in FIG. 14, the functions of the six widgets W11, W12, W13, W14, W15, and W16 having the same shapes as those of the six figures constituting Tetris may be related to each other, may have a common theme, or may be completely different.

The user purchases the widgets whenever necessary. If the user has collected five widgets related to Tetris, the game function of the integrated widget according to the present exemplary embodiment stimulates the user's desire with respect to the remaining single widget. Specifically, the user would purchase the remaining single widget according to his desire for enjoying the Tetris game regardless of its necessity.

When the six widgets W11, W12, W13, W14, W15, and W16 are merged to create an integrated widget, the user may operate the integrated widget in the same manner as the case illustrated in FIG. 12E.

As described above with reference to FIG. 12E, the integrated widget may perform the game function or may perform the functions of the individual widgets W11, W12, W13, W14, W15, and W16 constituting the integrated widget according to a user selection.

In order to perform the functions of the individual widgets W11, W12, W13, W14, W15, and W16, the integrated widget icon may include a button B10. When the button B10 is selected (touched), the controller 180 may provide control to make the individual widgets W11, W12, W13, W14, W15, and W16 appear around the icon of the integrated widget so the user can select (and execute) one of the individual widgets. The controller 180 may be configured such that the individual widgets W11, W12, W13, W14, W15, and W16 appear around the icon of the integrated widget only while the user touches the button B10.

Also, the individual widgets around the icon of the integrated widget may be implemented such that they appear during a certain time when the button B10 is touched, and then disappear. Also, similar to the case shown in FIG. 12E, when the user separates a particular widget from the integrated widget while the individual widgets appear around the icon of the integrated widget, the corresponding widget is demerged from the integrated widget.

In the exemplary embodiment illustrated in FIG. 14, the game function can be executed only when all of the certain number (e.g., six) of widgets are merged. Meanwhile, the game level may be updated or a number of rounds may be increased each time widgets are merged.

For example, in case of a combative sport game, if the service provider distributes or sells widgets related to the combative sport game, the user may execute the combative sport game by simply generating an integrated widget by merging two widgets. In this case, however, the level of the game or its number of rounds may be limited.

In order to update the level of the combative sport game or increase the number of rounds, the user may additionally purchase or download relevant widgets.

Alternatively, when an integrated widget is generated by merging two widgets, authority for using the integrated widget may be limited in the form of a light version. An integrated widget may be implemented to notify a user about purchasing or downloading the remaining widgets when a predetermined time lapses when a usage term or number are limited.

A widget display method for management according to a second exemplary embodiment of the present invention will now be described.

For a mobile terminal that must be easily carried around and portable, there is a spatial limitation in displaying widgets on the display device. Hereinafter, various widget management methods utilizing a limited space will be described.

Figure 15:
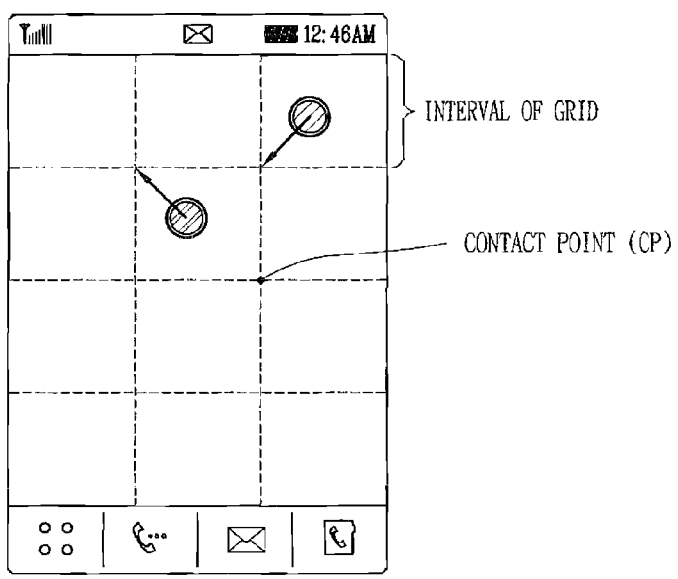
FIG. 15 is an overview of a display screen illustrating disposition of automatically aligned widgets according to an exemplary embodiment of the present invention.

FIG. 15 is an overview of a display screen illustrating disposition of automatically aligned widgets according to an exemplary embodiment of the present invention. Grids having certain intervals are displayed on the screen of the terminal and widgets are aligned according to a user setting (e.g., automatic alignment or manual alignment or automatic sorting or manual sorting). Horizontal and vertical intervals of the grids may be changed arbitrarily by the user.

When the alignment is set as automatic alignment by the user, the controller 180 moves the widgets displayed on the screen to contact points of the nearest grids, as shown in FIG. 15.

Figure 16:
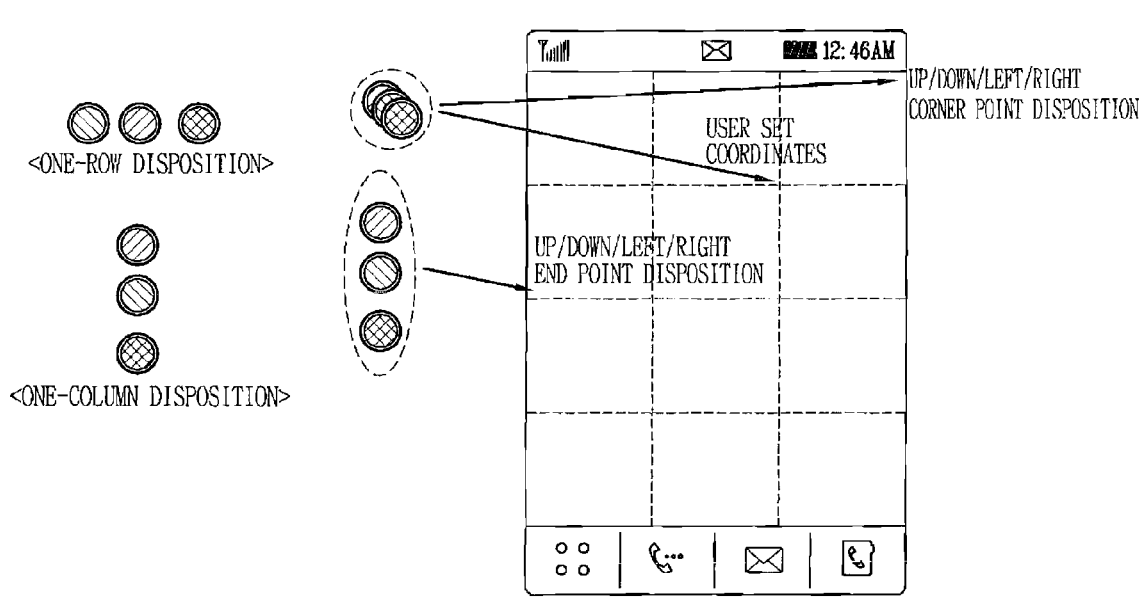
FIG. 16 is an overview of a display screen illustrating disposition of manually aligned widgets according to an exemplary embodiment of the present invention.

FIG. 16 is an overview of a display screen illustrating disposition of manually aligned widgets according to an exemplary embodiment of the present invention.

When manual alignment of the widgets is set, the user may set a widget alignment such as a one-column disposition, a one-row disposition, a vertical/horizontal corner (or end) point disposition, or a coordinates setting disposition.

Figure 17:
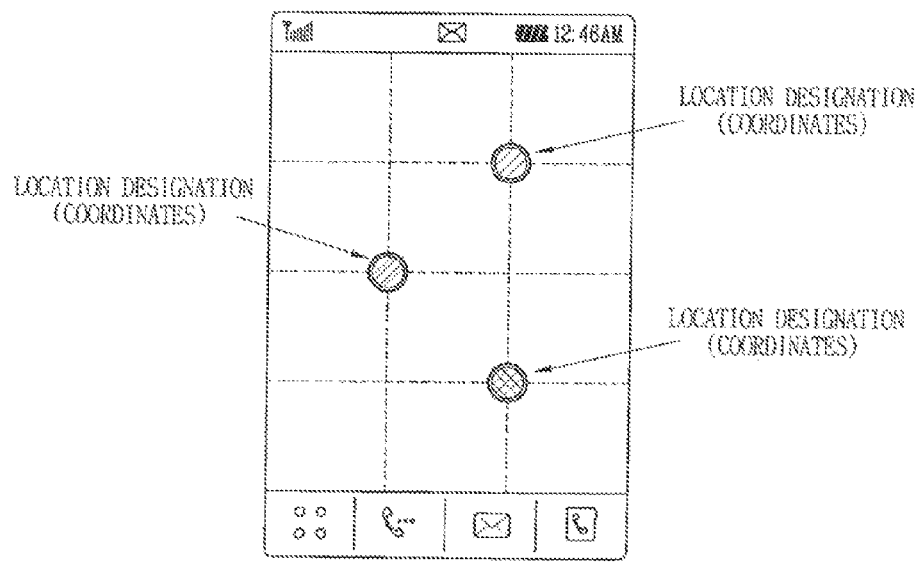
FIG. 17 is an overview of a display screen illustrating disposition of fixedly designated widgets according to an exemplary embodiment of the present invention.

FIG. 17 is an overview of a display screen illustrating disposition of fixedly designated widgets according to an exemplary embodiment of the present invention.

As shown in FIG. 17, the user can fix the widgets at locations of particular coordinate points. The user may fix widgets with a high use frequency at locations or points that can be easily recognized by the user. In the present exemplary embodiment, even when a large number of widgets are aligned on the screen, the user can quickly find and execute desired widgets.

With reference to FIG. 17, when the user shakes the terminal more than a certain number of times, the controller 180 may recognize the shaking through a sensor (e.g., a gyro sensor) of the terminal and position the widgets with a high use frequency at predetermined designated coordinates.

Figure 18:
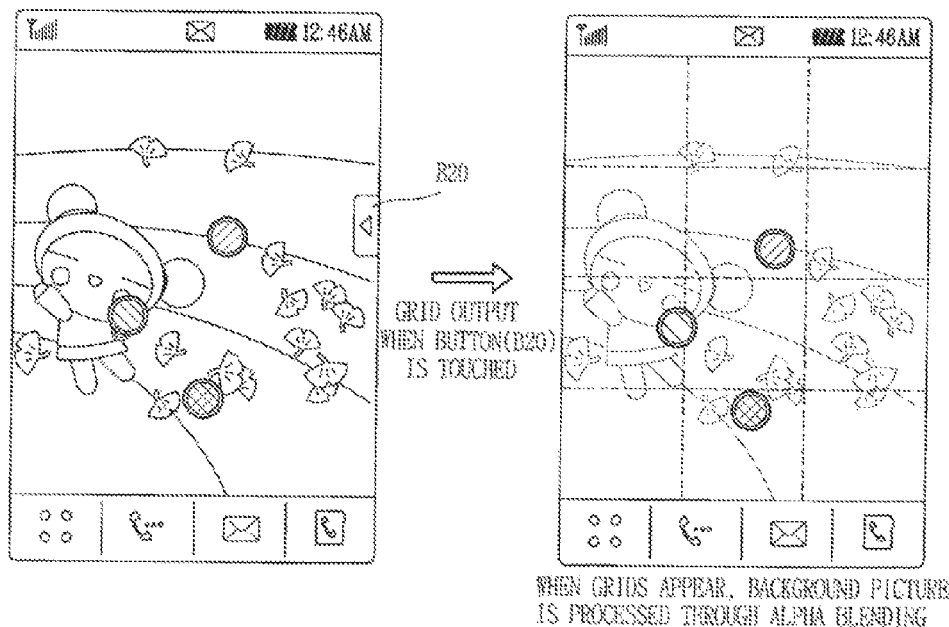
FIG. 18 is an overview of display screens set for widget disposition.

FIG. 18 is an overview of display screens set for widget disposition.

As shown in FIG. 18, when widgets are displayed, the display unit 151 may display a software button B20 for displaying grids.

When manipulation (e.g., pressing) of the software button B20 is detected, the controller 180 displays (or removes) horizontal and vertical grids at certain intervals on the screen and applies a special effect (e.g., alpha blending) to the background image so that the widgets and the grids can be more emphasized (or conspicuous).

Figure 19:
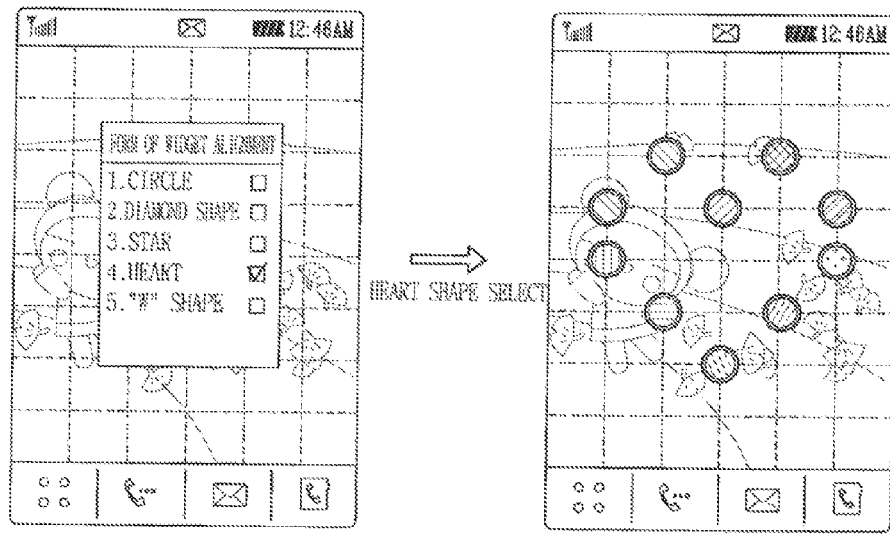
FIG. 19 is an overview of display screens for widget disposition when transferring a particular message.

FIG. 19 is an overview of display screens of widget disposition for transferring a particular message.

The controller 180 may dispose widgets such that a particular message can be transmitted. For example, when the user selects one (e.g., heart-like shape) of various shapes provided by the terminal, the controller 19 disposes the widgets in the heart-like shape as shown in FIG. 19, thereby expressing the user's intention (message) with the widget disposition.

Figure 20:
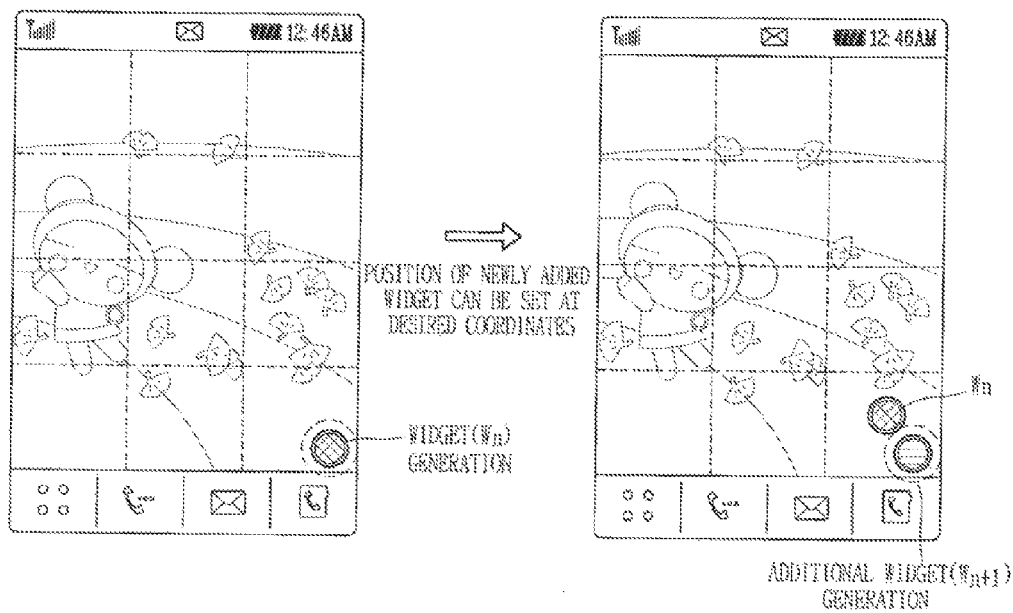
FIG. 20 is an overview of display screens illustrating locations of widgets newly added to the screen.

FIG. 20 is an overview of display screens illustrating locations of widgets newly added to the screen.

In the present exemplary embodiment, the controller 180 generates a newly added (or downloaded) widget at designated coordinates. When the newly added widget is displayed at the designated coordinates, the user can easily recognize it. The user can change the designated coordinates.

When a new widget $W_{n+1}$ (e.g., a widget-2) is added, if a certain widget $W_n$ (e.g., a widget-1) has already taken the designated coordinates, the controller 180 moves the existing widget $W_n$ (i.e., the widget-1) and displays the new widget $W_{n+1}$ (i.e., the widget-2) at the designated coordinates. This display method is applied in the same manner when several widgets are generated together at the same time. When the new widget $W_{n+1}$ (i.e., widget-2) appears at the designated coordinates, the controller 180 moves the existing widget $W_n$ (i.e., the widget-1) out of the designated coordinates as if a magnet is moved by a magnet having the same polarity.

Figure 21:
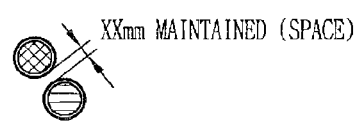
FIG. 21 illustrates the space between widgets.

FIG. 21 illustrates the space between widgets.

In the present exemplary embodiment, the controller 180 may set the interval (i.e., space or gap) between the widgets. By setting a minimum space between the widgets, the widgets can be easily discriminated by a user.

The space setting function of the widget is to maintain more than a certain distance between the widgets when the widgets are aligned automatically or manually. When the user shakes the terminal more than a certain number of times, the controller 180 may recognize the shaking via the sensor (e.g., the gyro sensor) provided in the terminal and perform automatic alignment. When the user directly moves a widget through a touch input (e.g., drag-and-drop), the widgets can be maintained at a certain interval from each other without overlapping. The user may change the space set between the widgets. Also, the user may release the function of setting a space between the widgets. When the space setting function is released, two or more widgets may be displayed in an overlap manner.

Figure 22:
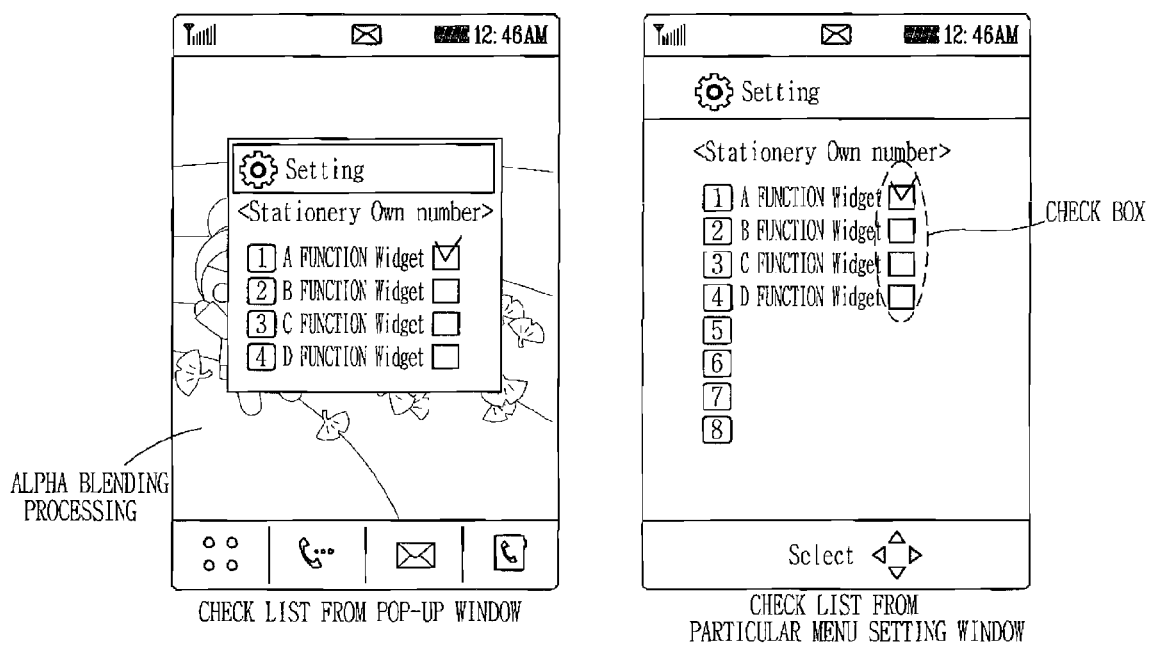
FIG. 22 is an overview of display screens illustrating a widget management tool for a screen display.

FIG. 22 is an overview of display screens illustrating a widget management tool for a screen display.

As shown in FIG. 22, a widget management tool according to the present exemplary embodiment may be displayed in the form of a pop-up window or in the form of a menu setting window.

The user may set a widget alignment method with respect to a list view through the widget management tool.

Specifically, according to the user setting, the widget management tool aligns widgets in the order of download or generation date and time. Also, the widget management tool can align the widgets discriminately according to an old list or the latest list. Also, the widget management tool may discriminately align frequently used widgets and align infrequently used widgets. In this case, the widget management tool may also display the number of widget calls. Also, when the user shakes the mobile terminal more than a certain number of times, the controller 180 may recognize the shaking and perform automatic alignment via the sensor (e.g., the gyro sensor) provided in the terminal.

Also, the widget management tool can align the widgets according to categories having a similar function. For example, time-related widgets such as a digital clock, an analog clock, and a dual-time may be separately displayed. Furthermore, calendar-related widgets, such as a monthly calendar, a daily calendar, and a yearly calendar may be separately displayed. Moreover, camera-related widgets, such as a flash, a zoom, and a filter may be separately displayed.

Also, the widget management tool may provide a widget concealment function according to a user setting. When the user selects a check box of a particular category, widgets of the corresponding category can be concealed from the screen. The concealment function may be applied according to functional categories of widgets or may be applied by the widgets.

Figure 23:
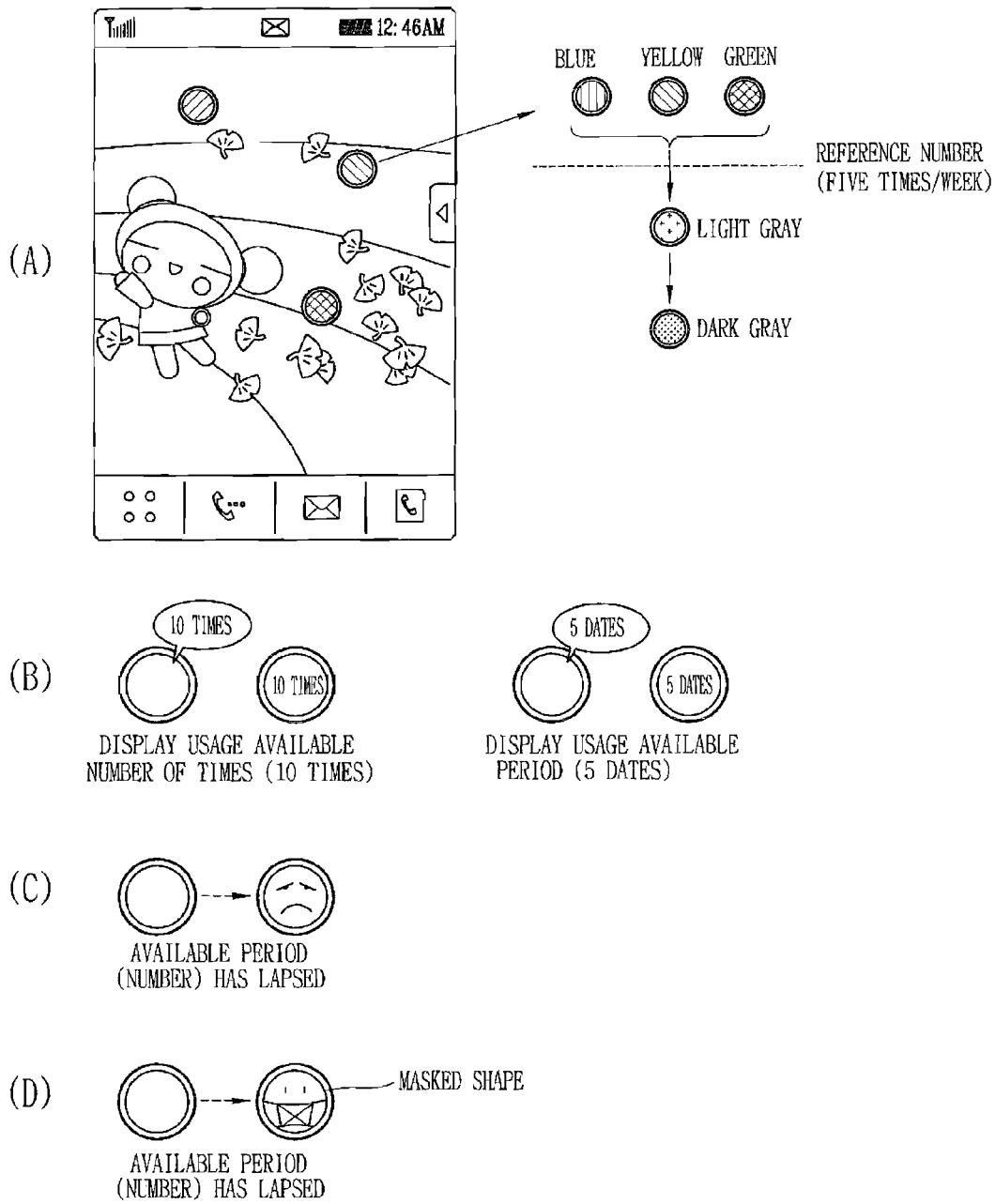
FIGS. 23(A) to 23(D) illustrate a method for discriminating widgets based on color.

FIG. 23 illustrates a method for discriminating widgets based on color.

As shown in FIG. 23, the widget management tool according to the present exemplary embodiment may display widgets in the form of a pop-up window or a menu setting window.

The controller 180 may display the widgets in different colors according to their use frequency. The user may recognize the call (i.e., retrieval or use) frequency of corresponding widgets based on the color of the widgets displayed on the screen.

For example, based on a use frequency of five times per week, if widgets have been called (used) five times or less per week, the controller may display them in light gray, and if widgets have been called (used) three times or less per week, the controller 180 may display them in dark gray. In addition, a use reference date of the widgets may be determined, and different colors may be applied to widgets according to the call or use frequency after a reference date.

In the present exemplary embodiment, the controller 180 may apply the method illustrated in FIG. 23 to widgets of a light version (sample or shareware) having a limited usage number of times or usage period.

If a usage number of times or a usage period of a widget is impending, the color of the widget may be changed to black and white (e.g., a light gray color tone) to allow the user to recognize that the usage available number of times or period of the corresponding widget is at hand.

In case of a widget whose usage number of times or period has expired, the widget may be displayed in a dark gray color tone and a portion of the function of the corresponding widget may be impeded, thus limiting execution of the widget.

As for the limitation of the usage number of times or period of widgets, another discriminating method can be applied.

For example, as shown in FIG. 23(B), the controller may display an available period (date or time) or an available number of widgets on the corresponding widget icon. When the number displayed on the widget icon is gradually decreasing, the user can recognize that the available number or period of the widget is limited.

Also, as shown in FIGS. 23(C) and 23(D), the widget icon may have a certain look (e.g., an emoticon of a depressed (or sad) look) to allow the user to recognize that the available number or period of the widget is limited.

Figure 24:
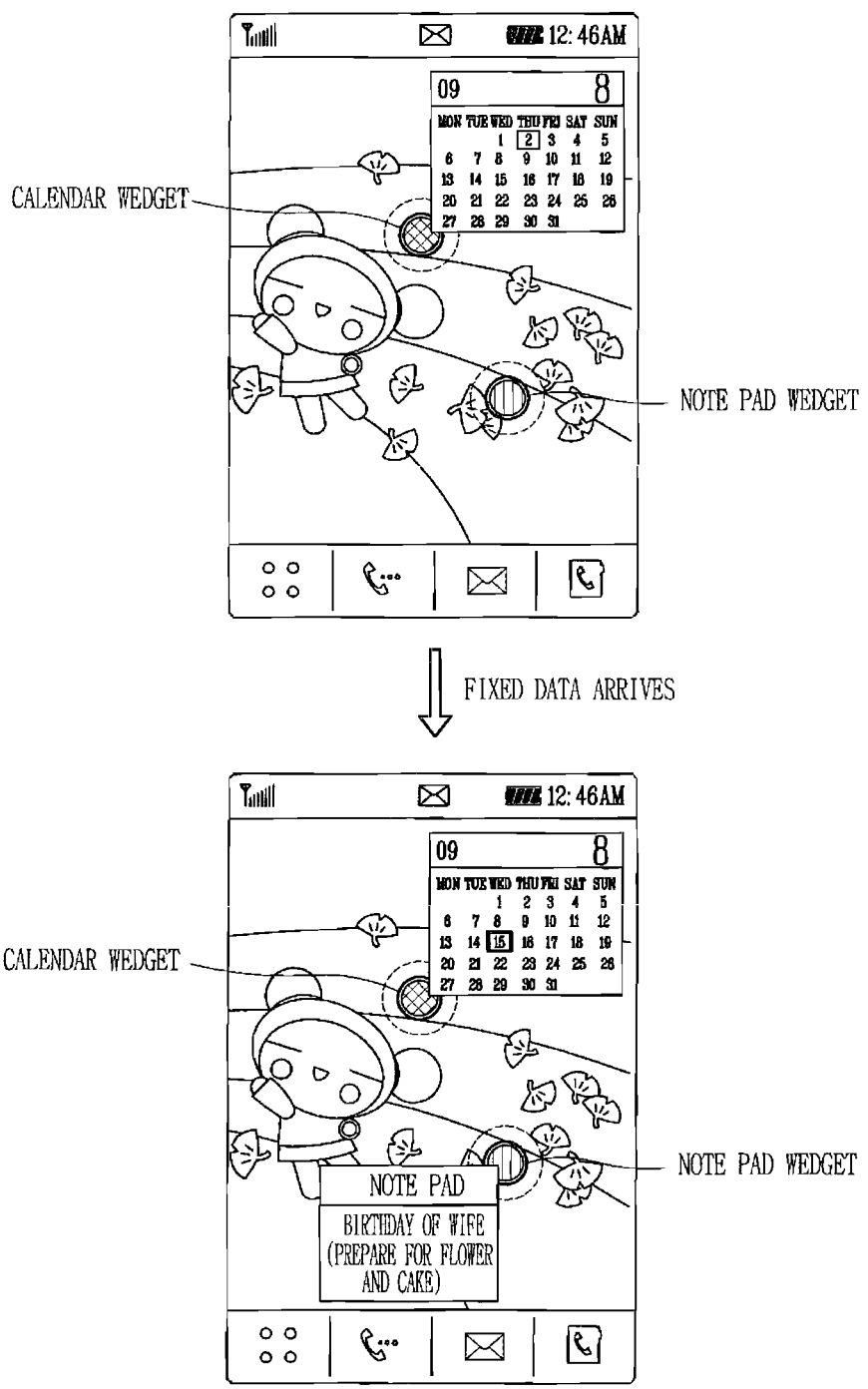
FIG. 24 is an overview of display screens illustrating a function connection between widgets.

FIG. 24 illustrates is an overview of display screens illustrating a function connection between widgets.

According to the present exemplary embodiment, the connection function between widgets means that, when a particular condition is met, an already executed widget calls a certain widget.

For example, it is assumed that the user makes note of an important event for a particular date (e.g., $15^{th}$, August). Then, the user may set the connection function between a calendar widget and a note pad widget.

When the particular date (e.g., $15^{th}$, August) arrives, the calendar widget may call the note pad widget and the called note pad widget may display the event in a manner that the user can recognize the event (e.g., alarm sound, vibration, screen image blinking)

A widget display method of a physical aspect of the mobile terminal according to a third exemplary embodiment of the present invention will now be described.

In the third exemplary embodiment, in order to allow widgets to have a mass sense, physical factors are applied to a widget operation (or driving).

Figure 25:
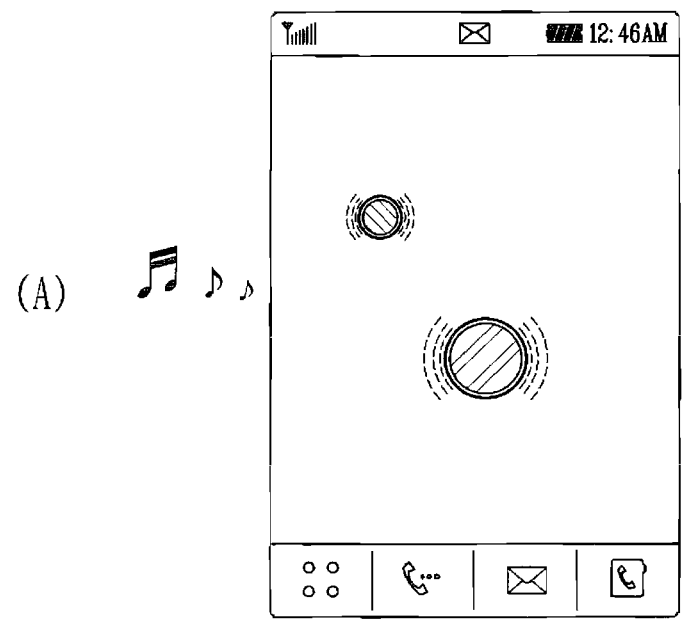
FIGS. 25(A) and 25(B) are overviews of display screens illustrating a mass sense of widgets.
Figure 25:
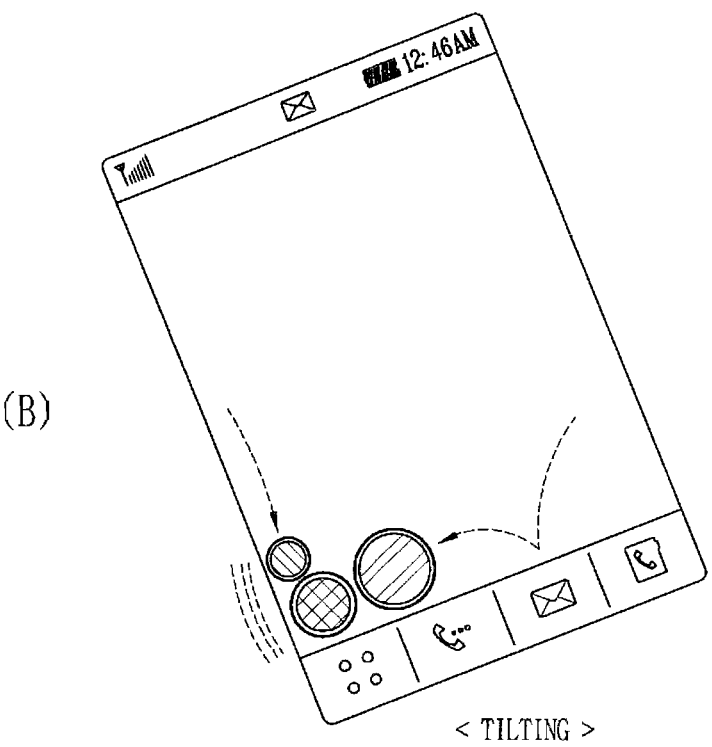

FIGS. 25(A) and 25(B) are overviews of display screens illustrating a mass sense of widgets.

As shown in FIG. 25(A), the controller 180 may output physical factors regarding the sense of hearing (e.g., a sound), the sense of touch (e.g., vibration), or the sense of sight, along with execution of a corresponding widget in consideration of the size, volume, shape, and quantity of the widgets. The strength of the physical factors (e.g., the size of a sound, the strength or duration of vibration, or the speed of a movement (or wobbling) transferred to the user may vary depending on the size, volume, shape and quantity of the widgets.

In the present exemplary embodiment, the size of a widget may be set proportional to the use frequency or importance. Also, the strength of the physical elements (e.g., the size of a sound, the strength or duration of vibration, or the speed of a movement (or wobbling) output when the widget is executed may be implemented proportional to the size of the corresponding widget.

In the present exemplary embodiment, when the user shakes the terminal, the controller 180 detects the shaking and may provide control to shake the widgets according to the degree of shaking. Also, the controller 180 may output the physical factors (e.g., sound or vibration) along with the shaking of the widgets.

FIG. 25(B) illustrates the movement of widgets with respect to gravity.

As shown in FIG. 25(B), the controller 180 controls the movement of widgets according to the tilting of the terminal. Similar to the manner in which the marbles within a box collide and roll, the widgets on the screen may make the same movement as the marbles within the box.

When the widgets collide with each other or collide with a wall surface of the screen, the controller 180 outputs physical factors (e.g., sound or vibration) indicating the degree of collision. The strength (e.g., the size of a sound, the strength or duration of vibration, or the speed of a movement (or wobbling) of the physical factors transferred to the user may vary according to the size, volume, shape, and quantity of the widgets.

A widget display method of a visual aspect according to a fourth exemplary embodiment of the present invention will now be described.

In the fourth exemplary embodiment of the present invention, a motion path regarding a widget movement is set so that widgets can move along the motion path at certain periods. In the present exemplary embodiment, the user may recognize a current time, an event (or a project), or a proceeding situation based on the movement of locations of widgets appearing on the screen of the terminal.

Figure 26:
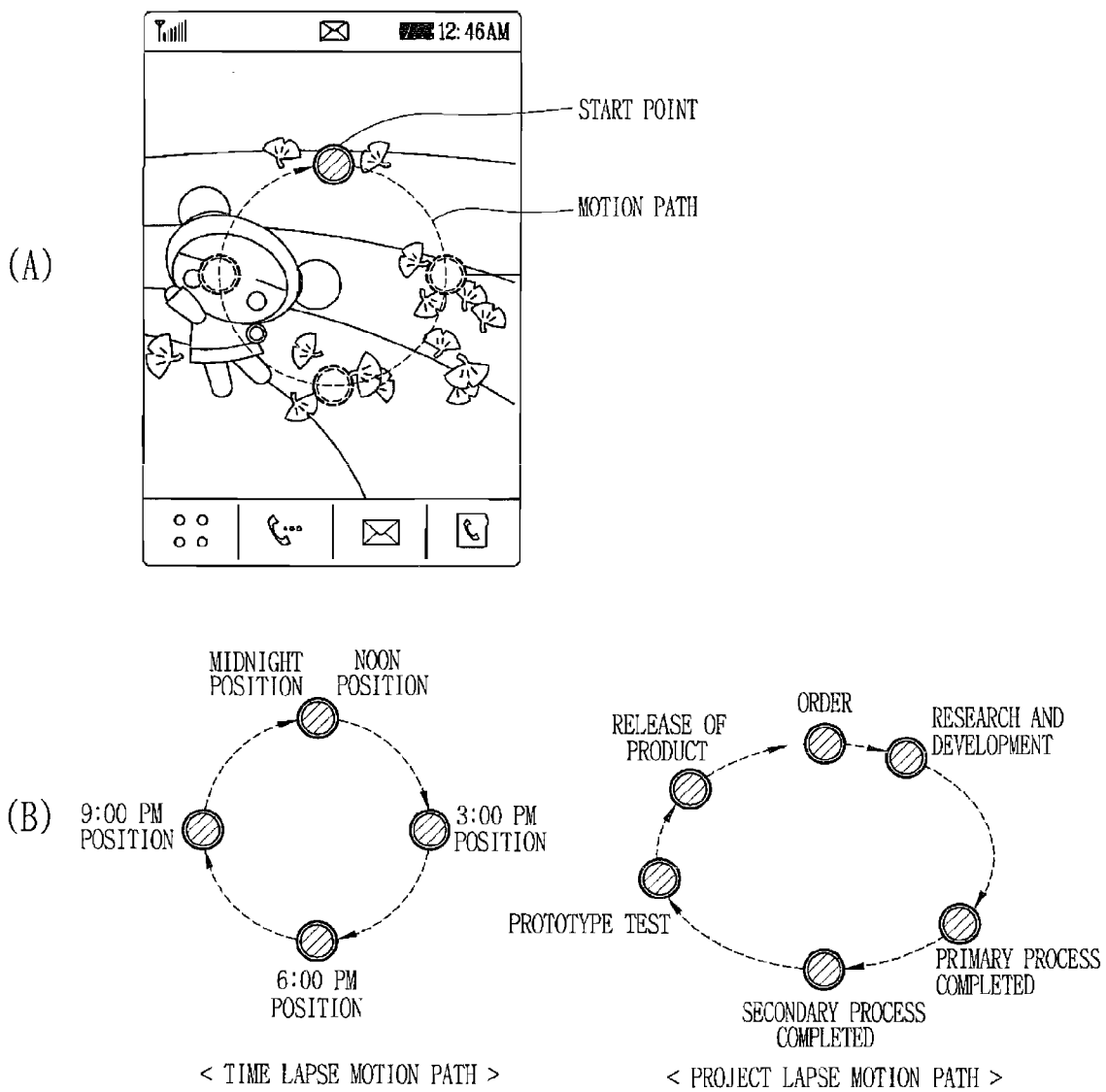
FIGS. 26(A) and 26(B) illustrate a method for displaying widgets by using motion paths.

FIGS. 26(A) and 26(B) illustrate a method for displaying widgets by using motion paths, in which a motion path indicating a time lapse and a motion path indicating a project status are shown.

In case of the time lapse motion path, as shown in FIG. 26(B), the location of a widget may move with the lapse of time. The user may estimate a current time zone of the day through the movement and location of the widget on the motion path.

In case of the motion path indicating a project status, the user may set a start point (e.g., an ordering time point) for a widget movement, the shape of a motion path, an overall time lapse (e.g., an overall project period), and a time duration of each section (e.g., a scheduled performing period of each process). When the user setting is completed, the controller 180 locates the corresponding widget at coordinates corresponding to a current time point among the overall time lapse, and moves the widget with time.

The user may check whether or not each process of the project is proceeding as planned through the movement or the location of the widget on the motion path.

In the present exemplary embodiment, the setting of the motion path and the movement of the widget may be implemented according to a method for recognizing a motion pattern of a flash.

A mobile terminal according to the present invention comprises an input unit configured to detect an external input, a display unit configured to display a plurality of widgets, and a controller configured to merge/demerge the plurality of widgets and execute an integrated function based on an integrated widget.

When an integrated widget is generated by merging a plurality of widgets, the controller assigns a new function to the generated integrated widget.

When the integrated widget is selected, the controller displays widgets constituting the integrated widget or a number of widgets constituting the integrated widget.

A certain number of widgets having at least a common theme, a common menu category, or a simultaneously-performed menu are merged into the integrated widget.

As described above, the widget display method according to the exemplary embodiments of the present invention may be implemented by computer-readable codes in a program-recorded medium. The computer-readable medium includes any kind of recording device in which data that can be read by a computer system is stored.

The computer-readable medium may include a ROM, a RAM, a CD-ROM, a magnetic tape, a floppy disk, and an optical data storage device. The computer-readable medium also includes implementations in the form of carrier waves or signals (e.g., transmission via the Internet). In addition, the computer may include the controller 180 of the terminal.

As so far described, according to the exemplary embodiments of the present invention, widgets are implemented to be merged and demerged, and the mobile terminal can display, operate and manage the widgets.

The concept of UI-wise merging and demerging is applied to simple widget functions to update the widget functions. Also, widgets can be effectively managed through various widget operations.

In addition, the mass sense of widgets are expressed by using physical factors, and an autonomous movement is generated by a motion pattern recognition.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:
a touchscreen display; a memory; and
a controller cooperating with the memory and being configured to:
cause displaying, on the touchscreen display, a plurality of icons;
receive a first input in response to a first touch input received at a first location of the touchscreen display, wherein the first location of the first touch input is proximate to a displayed location of a first icon of the plurality of icons;
receive a second input responsive to a drag input received at the touchscreen display, wherein the drag input extends from the first location toward a displayed location of a second icon of the plurality of icons;
cause merging of the first icon and the second icon to form an integrated icon in response to the drag input;
cause displaying for a time period, on the touchscreen display, a merging indication to indicate a merging state of the first icon and the second icon, wherein the merging indication comprises modifying a displayed characteristic of the second icon;
cause displaying, on the touchscreen display, after the time period, the integrated icon, wherein the integrated icon comprises a first indicator and a group of second indicators, wherein the first indicator indicates that the integrated icon includes merged icons, wherein each indicator of the group of second indicators separately identifies one of the first icon or the second icon, and wherein each indicator of the group of second indicators is respectively smaller in displayed size than the first icon and the second icon;
cause displaying, on the touchscreen display, an input window that permits user-modification of a title of the integrated icon;
receive a third input while the input window is displayed, the third input permitting modification of the title of the integrated icon;
store, in the memory, the modified title of the integrated icon; and
cause displaying, on the touchscreen display, a list of items that respectively identify the first icon and the second icon at a location that is proximate to a displayed location of the integrated icon, wherein the displaying of the list of items occurs responsive to receiving a fourth input with regard to the integrated icon, and wherein the integrated icon, the indicators, and the list of items are all displayed together.

2. The mobile terminal of claim 1, wherein the list of items comprises icons, each separately associated with one of the first icon or the second icon.

3. The mobile terminal of claim 1, wherein the list of items comprises text for each of the first icon and the second icon, the text describing a function of an associated icon of the first icon or the second icon.

4. The mobile terminal of claim 1, wherein the controller is further configured to:

execute a selected item of the list of items that respectively identify the first icon and the second icon responsive to an input that is received while the list of items is displayed.

5. The mobile terminal of claim 1, wherein the touchscreen display comprises a display region within which all of the plurality of icons are displayed, wherein all icons displayed within the region are user selectable, and are movable within the region responsive to user input.

6. The mobile terminal of claim 1, wherein each of the first icon or the second icon that form the integrated icon represents a functional application of the mobile terminal.

7. The mobile terminal of claim 1, wherein the controller is further configured to:
cause demerging the first icon and the second icon from the integrated icon in response to receiving a fifth input; and
cause displaying, on the touchscreen display, the first icon and the second icon.

8. The mobile terminal of claim 1, wherein the indicated merging state of the first icon and the second icon results from modifying displayed characteristics of both the first icon and the second icon.

9. The mobile terminal of claim 1, wherein each indicator of the group of second indicators has substantially a same displayed size.

10. The mobile terminal of claim 1, wherein the list of items comprises icons, wherein each icon of the list of items is the same as a respective one of the first icon or the second icon.

11. The mobile terminal of claim 1, wherein the list of items comprises icons, wherein each icon of the list of items is the same as a respective one of the first icon or the second icon, and wherein each icon of the list of items is different.

12. The mobile terminal of claim 1, wherein the indicated merging state of the first icon and the second icon results from modifying displayed characteristics of both the first icon and the second icon, wherein the list of items comprises icons that respectively identify the first icon and the second icon, wherein each icon of the list of items corresponds to a different application executable at the mobile terminal, and wherein the controller is further configured to:
execute an application that corresponds to a selected icon of the list of items responsive to an input that is received while the list of items is displayed.

13. A method for managing operation of icons of a mobile terminal, the method comprising:
displaying, on a touchscreen display, a plurality of icons;
receiving a first input in response to a first touch input received at a first location of the touchscreen display, wherein the first location of the first touch input is proximate to a displayed location of a first icon of the plurality of icons;
receiving a second input responsive to a drag input received at the touchscreen display, wherein the drag input extends from the first location toward a displayed location of a second icon of the plurality of icons;
merging of the first icon and the second icon to form an integrated icon in response to the drag input;
displaying for a time period, on the touchscreen display, a merging indication to indicate a merging state of the first icon and the second icon, wherein the merging indication comprises modifying a displayed characteristic of the second icon;
displaying, on the touchscreen display, after the time period, the integrated icon, wherein the integrated icon comprises a first indicator and a group of second indicators, wherein the first indicator indicates that the integrated icon includes merged icons, wherein each indicator of the group of second indicators separately identifies one of the first icon or the second icon, and wherein each indicator of the group of second indicators is respectively smaller in displayed size than the first icon and the second icon;
displaying, on the touchscreen display, an input window that permits user-modification of a title of the integrated icon;
receiving a third input while the input window is displayed, the third input permitting modification of the title of the integrated icon;
storing, in memory, the modified title of the integrated icon; and
displaying, on the touchscreen display, a list of items that respectively identify the first icon and the second icon at a location that is proximate to a displayed location of the integrated icon, wherein the displaying of the list of items occurs responsive to receiving a fourth input with regard to the integrated icon, and wherein the integrated icon, the indicators, and the list of items are all displayed together.

14. The method of claim 13, further comprising: detecting an external impact applied to the mobile terminal; and outputting at least a vibration, a sound, or an image shaking as a physical factor applied to at least each of the plurality of icons or the integrated icon in response to the detection of the external impact.

15. The mobile terminal of claim 1, wherein:
the integrated icon is a first integrated icon;
the touchscreen display is further configured to display the first integrated icon and at least one single icon; and
the controller is further configured to control the touchscreen display to merge one of the at least one single icon and the first integrated icon to form a second integrated icon that comprises three or more merged icons.

16. The mobile terminal of claim 15, wherein the controller is further configured to separate a specific one of the icons from the second integrated icon in response to a received input.

17. The mobile terminal of claim 15, wherein the controller is further configured to:
control the touchscreen display to display an idle screen; and
control the touchscreen display to display, on the idle screen, at least one of the at least one single icon together with the second integrated icon.

18. The method of claim 13, wherein the list of items comprises icons, each separately associated with one of the first icon or the second icon.

19. The method of claim 13, wherein the list of items comprises text for each of the first icon or the second icon, the text describing a function of an associated icon of the first icon or the second icon.

20. The method of claim 13, further comprising: executing a selected item of the list of items that respectively identify the first icon and the second icon responsive to an input that is received while the list of items is displayed.

21. The method of claim 13, wherein the touchscreen display comprises a display region within which all of the plurality of icons are displayed, wherein all icons displayed within the region are user selectable, and are movable within the region responsive to user input.

22. The method of claim 13, wherein each of the first icon or the second icon that form the integrated icon represents a functional application of the mobile terminal.

23. The method of claim 13, further comprising: demerging the first icon and the second icon from the integrated icon when a particular item corresponding to one of the first icon and the second icon is separated from the list of the items; and
   displaying, on the touchscreen display, the first icon and the second icon.

24. The method of claim 13, wherein each indicator of the group of second indicators has substantially a same displayed size.

25. The method of claim 13, wherein the list of items comprises icons, wherein each icon of the list of items is the same as a respective one of the first icon or the second icon.

26. The method of claim 13, wherein the list of items comprises icons, wherein each icon of the list of items is the same as a respective one of the first icon or the second icon, and wherein each icon of the list of items is different.

27. The method of claim 13, wherein the indicated merging state of the first icon and the second icon results from modifying displayed characteristics of both the first icon and the second icon, wherein the list of items comprises icons that respectively identify the first icon and the second icon, wherein each icon of the list of items corresponds to a different application executable at the mobile terminal, and wherein the method further comprises:
   executing an application that corresponds to a selected icon of the list of items responsive to an input that is received while the list of items is displayed.

28. The method of claim 13, wherein each of the plurality of icons is a widget.

29. A mobile terminal, comprising:
a touchscreen display;
a memory; and
a controller cooperating with the memory and being configured to:
   cause displaying, on the touchscreen display, a plurality of icons; receive a first input in response to a first touch input received at a first location of the touchscreen display, wherein the first location of the first touch input is proximate to a displayed location of a first icon of the plurality of icons;
   receive a second input responsive to a drag input received at the touchscreen display, wherein the drag input extends from the first location toward a displayed location of a second icon of the plurality of icons;
   cause merging of the first icon and the second icon to form an integrated icon in response to the drag input;
   cause displaying for a time period, on the touchscreen display, a merging indication to indicate a merging state of the first icon and the second icon, wherein the merging indication comprises modifying a displayed characteristic of the second icon;
   cause displaying, on the touchscreen display, after the time period, the integrated icon, wherein the integrated icon comprises indicators, wherein each indicator of the indicators identifies one of the first icon or the second icon, and wherein each indicator of the indicators is respectively smaller in displayed size than the first icon and the second icon;
   cause displaying, on the touchscreen display, an input window that permits user-modification of a title of the integrated icon;
   receive a third input while the input window is displayed, the third input permitting modification of the title of the integrated icon;
   store, in the memory, the modified title of the integrated icon; and
   cause displaying, on the touchscreen display, a list of items that respectively identify the first icon and the second icon at a location that is proximate to a displayed location of the integrated icon, wherein the displaying of the list of items occurs responsive to receiving a fourth input with regard to the integrated icon, and wherein the integrated icon, the indicators, and the list of items are all displayed together.

* * * * *